US012257194B1

(12) United States Patent
Almeida et al.

(10) Patent No.: US 12,257,194 B1
(45) Date of Patent: Mar. 25, 2025

(54) PASSENGER ASSIST ENTRY-EXIT ASSEMBLY AND VEHICLE WITH SAME

(71) Applicant: Zoox, Inc., Foster City, CA (US)

(72) Inventors: Reginaldo Alves de Almeida, Sabara (BR); Fabricio Cesar Oda, Dublin, CA (US); Anthony Earl, Witney (GB)

(73) Assignee: Zoox, Inc., Foster City, CA (US)

( * ) Notice: Subject to any disclaimer, the term of this patent is extended or adjusted under 35 U.S.C. 154(b) by 685 days.

(21) Appl. No.: 17/490,962

(22) Filed: Sep. 30, 2021

(51) Int. Cl.
*A61G 3/06* (2006.01)

(52) U.S. Cl.
CPC ............. *A61G 3/061* (2013.01); *A61G 3/067* (2016.11)

(58) Field of Classification Search
CPC .......... A61G 3/06; A61G 3/061; A61G 3/062; A61G 3/068; A61G 3/067; B65G 65/00; B65G 67/20
See application file for complete search history.

(56) References Cited

U.S. PATENT DOCUMENTS

D184,655 S * 3/1959 Baer .............................. D25/63
4,251,179 A * 2/1981 Thorley .................... B60R 3/02 105/430
4,757,876 A * 7/1988 Peacock .................... E06C 1/52 182/95
5,085,555 A * 2/1992 Vartanian .................. B60P 1/43 14/71.1
5,224,723 A * 7/1993 Hatas ........................ B60R 3/02 280/166
5,433,580 A * 7/1995 Kempf .................. A61G 3/068 414/545
5,439,342 A * 8/1995 Hall .......................... B60P 1/44 280/166
5,556,250 A * 9/1996 Fretwell ................ A61G 3/062 414/921
6,095,747 A * 8/2000 Cohn .................... B60P 1/4457 414/921
6,601,677 B1 * 8/2003 Storm .................. B66B 9/0869 414/921
6,764,123 B1 * 7/2004 Bilyard ............. B62D 33/0273 296/61
7,001,132 B2 * 2/2006 Koretsky .............. A61G 3/061 414/921
8,776,947 B1 * 7/2014 Wurth ....................... E06C 7/48 182/1
9,266,458 B2 * 2/2016 Michaud ................ B60P 1/435
9,380,760 B2 * 7/2016 Rorke .................... A01K 1/035
(Continued)

*Primary Examiner* — Abigail A Risic
(74) *Attorney, Agent, or Firm* — EIP US LLP

(57) ABSTRACT

A vehicle passenger assist entry-exit assembly may comprise a first panel, a second panel rotatably attached to the first panel, and a third panel rotatably attached to the second panel. The first, second and third panels may be coupled to a vehicle body and substantially linearly aligned when located under a floor of the vehicle's body in a retracted position. The passenger assist entry-exit assembly may further comprise a deployment actuator mechanism attachable to the vehicle body to enable the panels to move from the retracted position to a step forming deployed position and to a ramp forming deployed position. The vehicle passenger assist entry-exit assembly may further comprise a step actuator mechanism configured to rotate a step member of the third panel to form a step for the step forming deployed position.

19 Claims, 12 Drawing Sheets

(56) References Cited

U.S. PATENT DOCUMENTS

| | | | | |
|---|---|---|---|---|
| 9,580,910 | B1 * | 2/2017 | Morris | E04F 11/002 |
| 9,597,240 | B2 * | 3/2017 | Hermanson | B60P 1/435 |
| D1,005,621 | S * | 11/2023 | Zhu | D30/199 |
| 11,840,197 | B2 * | 12/2023 | Niemela | B60R 11/06 |
| 2006/0006023 | A1 * | 1/2006 | Lim | B60R 3/02 182/127 |
| 2008/0302312 | A1 * | 12/2008 | Steffey | A01K 1/035 119/849 |
| 2009/0020360 | A1 * | 1/2009 | May | E06C 1/387 182/1 |
| 2011/0139544 | A1 * | 6/2011 | Frick | E06C 7/42 182/27 |
| 2014/0219756 | A1 * | 8/2014 | Smith | A61G 3/065 414/812 |
| 2018/0228121 | A1 * | 8/2018 | Murray | A01K 29/00 |
| 2021/0155264 | A1 * | 5/2021 | MacPherson | A61G 3/065 |
| 2023/0039385 | A1 * | 2/2023 | Peterson | B60P 1/433 |

* cited by examiner

PASSENGER ASSIST ENTRY-EXIT ASSEMBLY AND VEHICLE WITH SAME

BACKGROUND

People desire the ability to enter (and exit) a vehicle easily and safely. Passengers typically enter and exit a vehicle by stepping directly onto, or off of, a body or frame of the vehicle such as a floor area of the vehicle.

BRIEF DESCRIPTION OF DRAWINGS

The detailed description is described with reference to the accompanying figures. The use of the same reference numbers in different figures indicates similar or identical components or features.

DETAILED DESCRIPTION

The present application relates to vehicles with assemblies for assisting passengers with safely and easily entering and exiting the vehicles. In examples, a vehicle may comprise a passenger assist entry-exit assembly substantially positioned inside a body of the vehicle in a retracted position and moveable from the retracted position to first and second deployed positions. The first deployed position may form a step to aid passengers as they enter or exit the vehicle, e.g., enter or exit a passenger seating area of the vehicle. The second deployed position may form a ramp to aid passengers as they enter or exit the vehicle, e.g., enter or exit a passenger seating area of the vehicle. In examples, the passenger assist entry-exit assembly may comprise a first panel, a second panel, and a third panel. The second panel may be rotatably attached to the first panel, and the third panel may comprise a step member and be rotatably attached to the second panel. The passenger assist entry-exit assembly may further comprise a deployment actuator mechanism and a step actuator mechanism. The deployment actuator mechanism may be operatively engaged with the first, second and third panels to move the panels from the retracted position where the first, second and third panels are substantially linearly aligned and located under a floor of the vehicle body to the step forming deployed position and to the ramp forming deployed position. In the step forming deployed position, at least the second and third panels may be located outside from under the floor, while the third panel may be angled downwardly relative to the second panel and the second panel may be angled downwardly relative to the first panel. In the ramp forming deployed position, the third panel, the second panel and the first panel may be located outside from under the floor and substantially linearly aligned to form the ramp. The step actuator mechanism may be operably engaged with the third panel to rotate the step member to form the step for the step forming deployed position.

Enabling a vehicle to deploy a passenger assist entry-exit assembly from under a floor to either a step or a ramp formation caters to various individual vehicle passenger desires or needs. For example, passengers with severe physical limitations may wish to deploy the ramp, while other passengers having less severe physical ailments or merely desiring easier (or safer) entry into (or exit from) the vehicle may wish to deploy the step.

Figure 1:
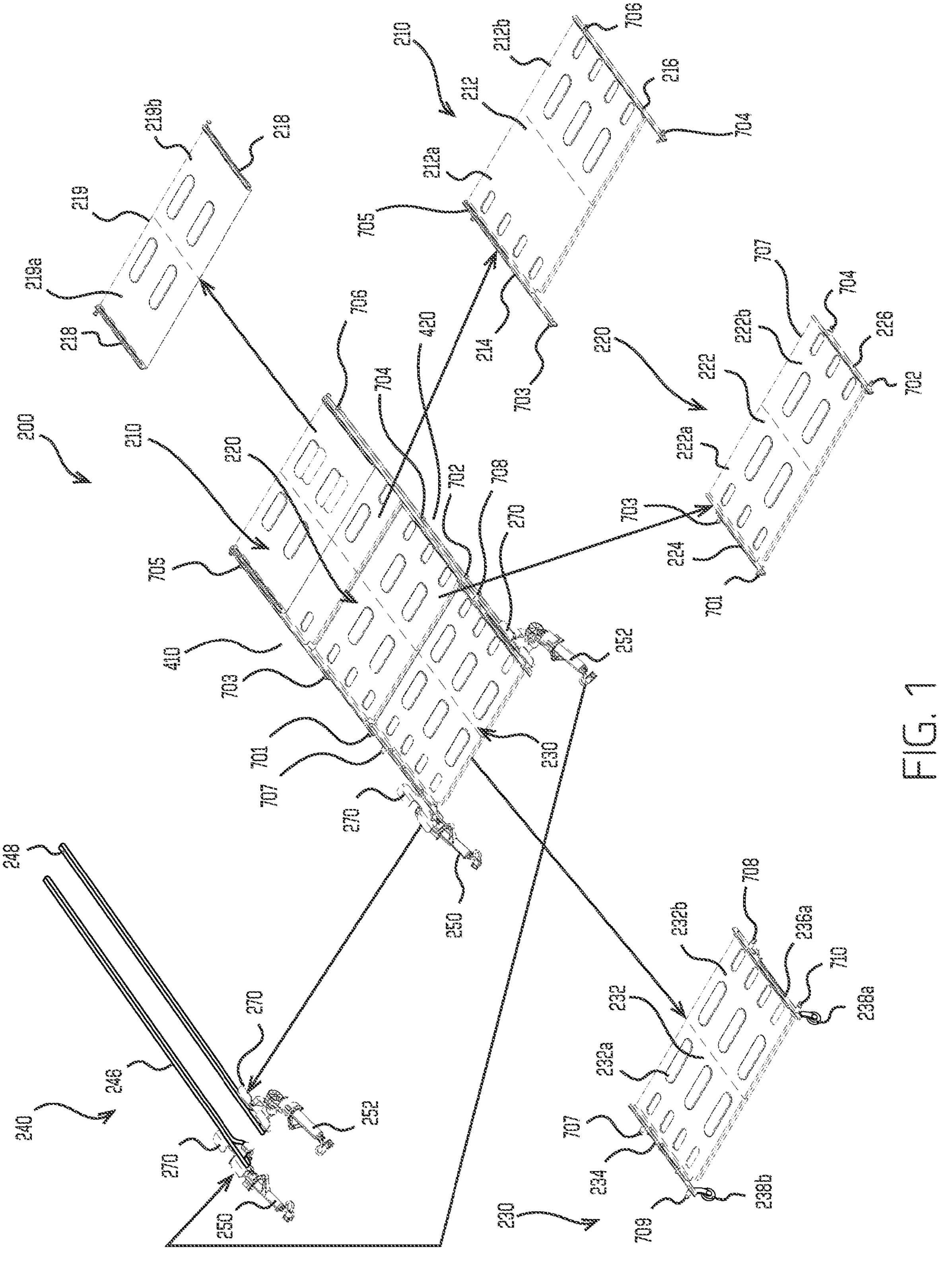
FIG. 1 is an exploded view of an example passenger assist entry-exit assembly of the present disclosure.
Figure 2:
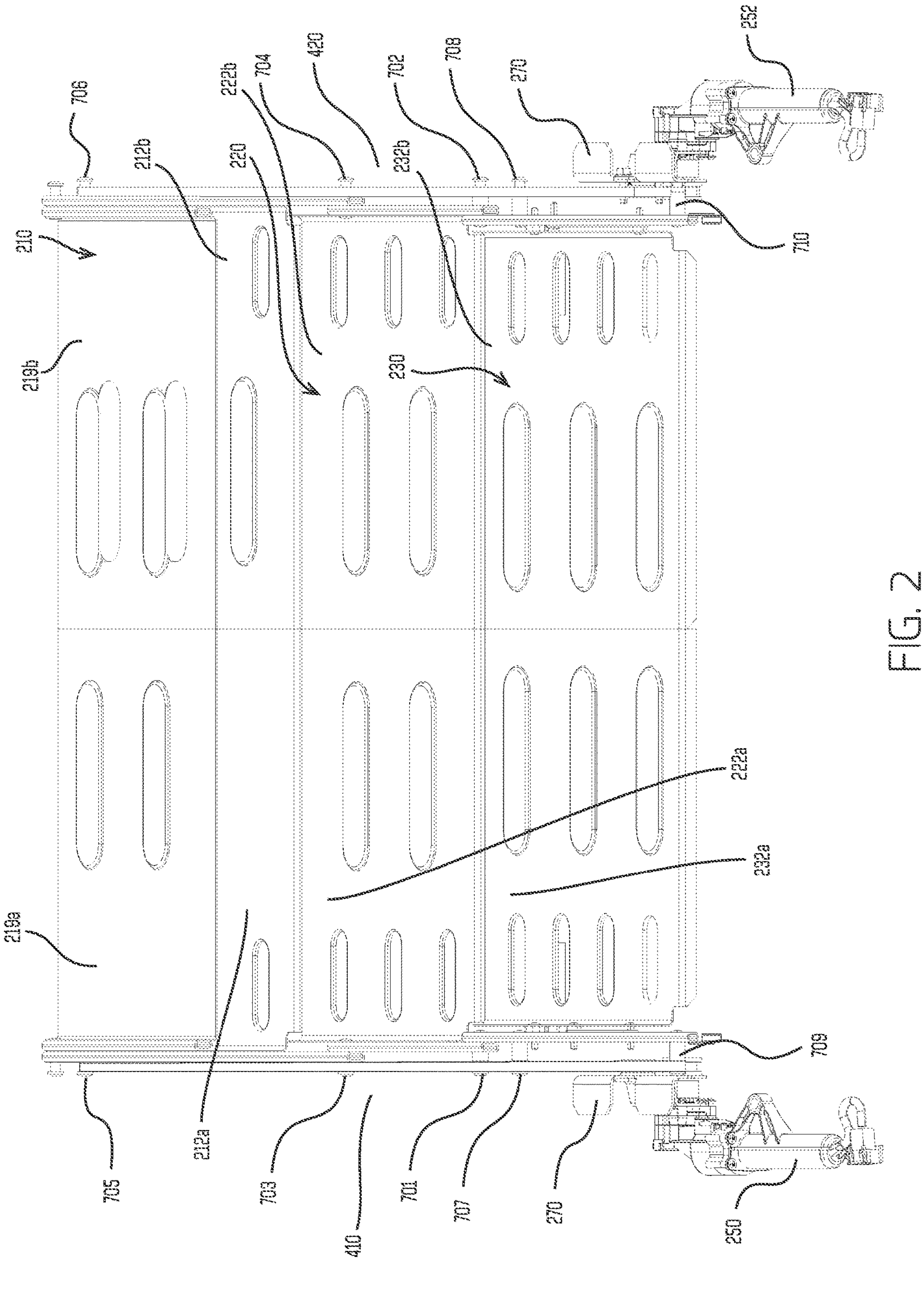
FIG. 2 is a perspective view of a top side of the passenger assist entry-exit assembly of FIG. 1.
Figure 3:
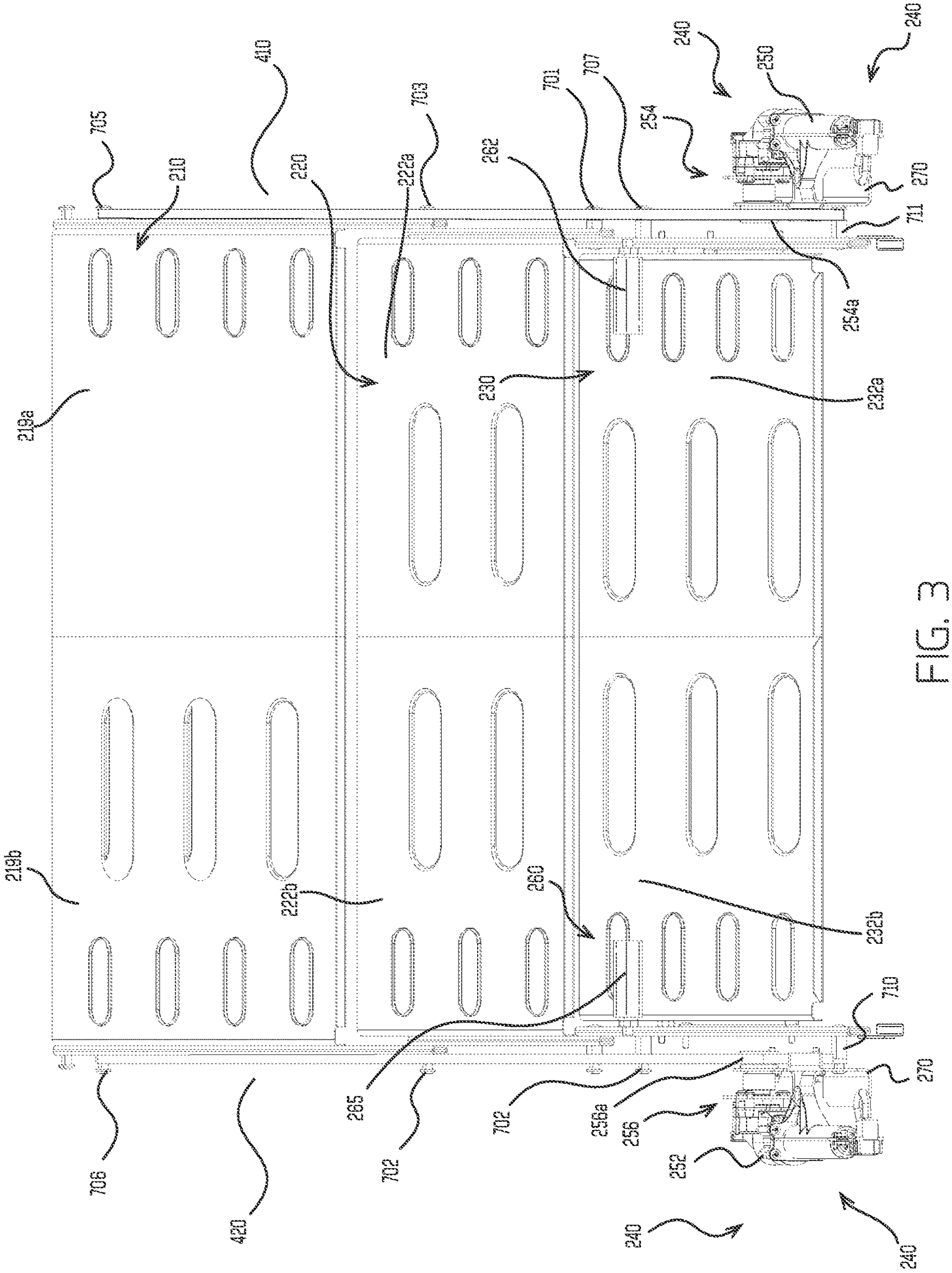
FIG. 3 is a perspective view of a bottom side of the passenger assist entry-exit assembly of FIG. 1.
Figure 4:
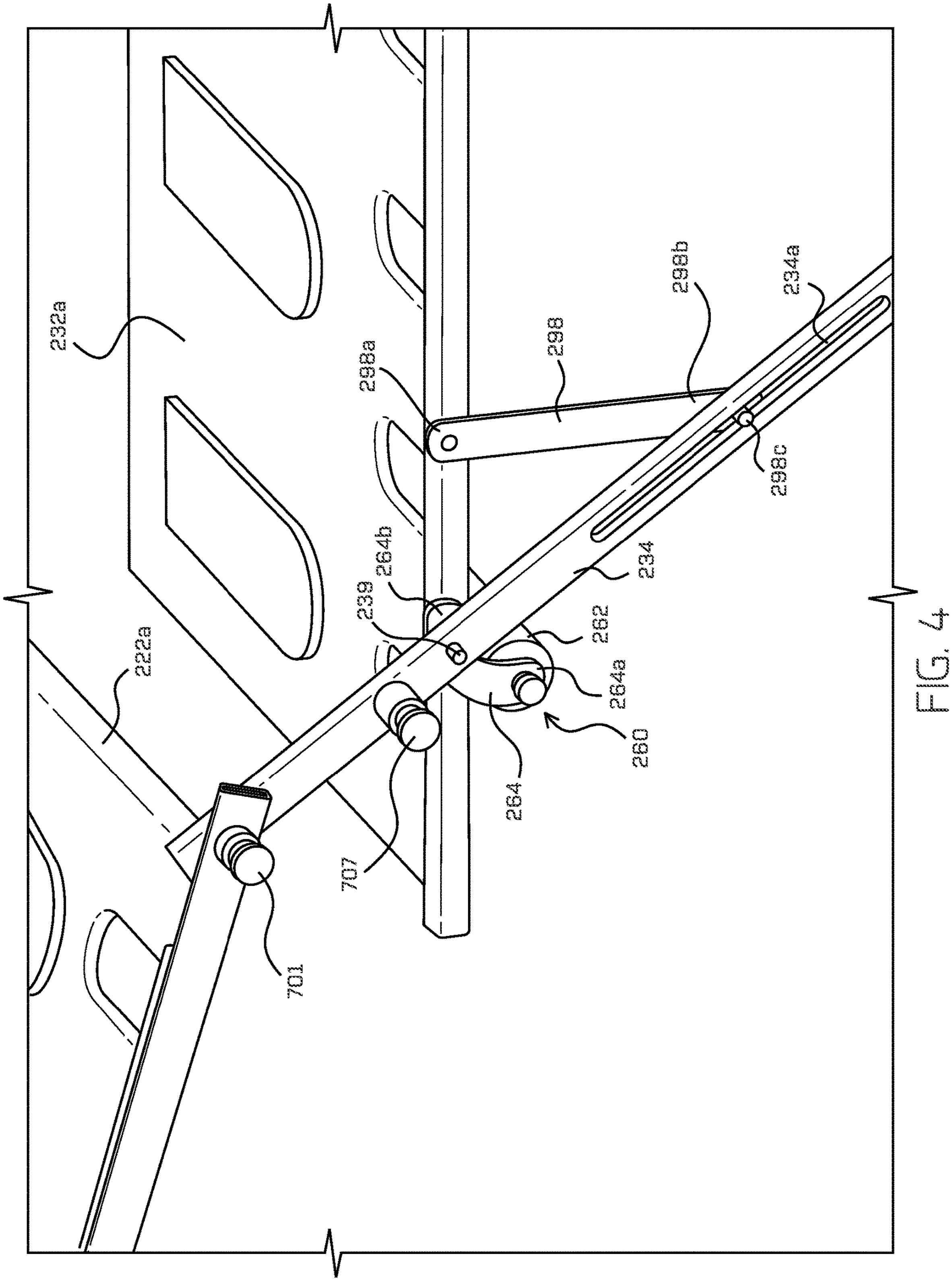
FIG. 4 is an enlarged perspective view illustrating a portion of a step actuator mechanism and a portion of a second panel, a third panel and a rotating step member of the passenger assist entry-exit assembly of FIGS. 1-3 in a step forming deployed position.
Figure 5:
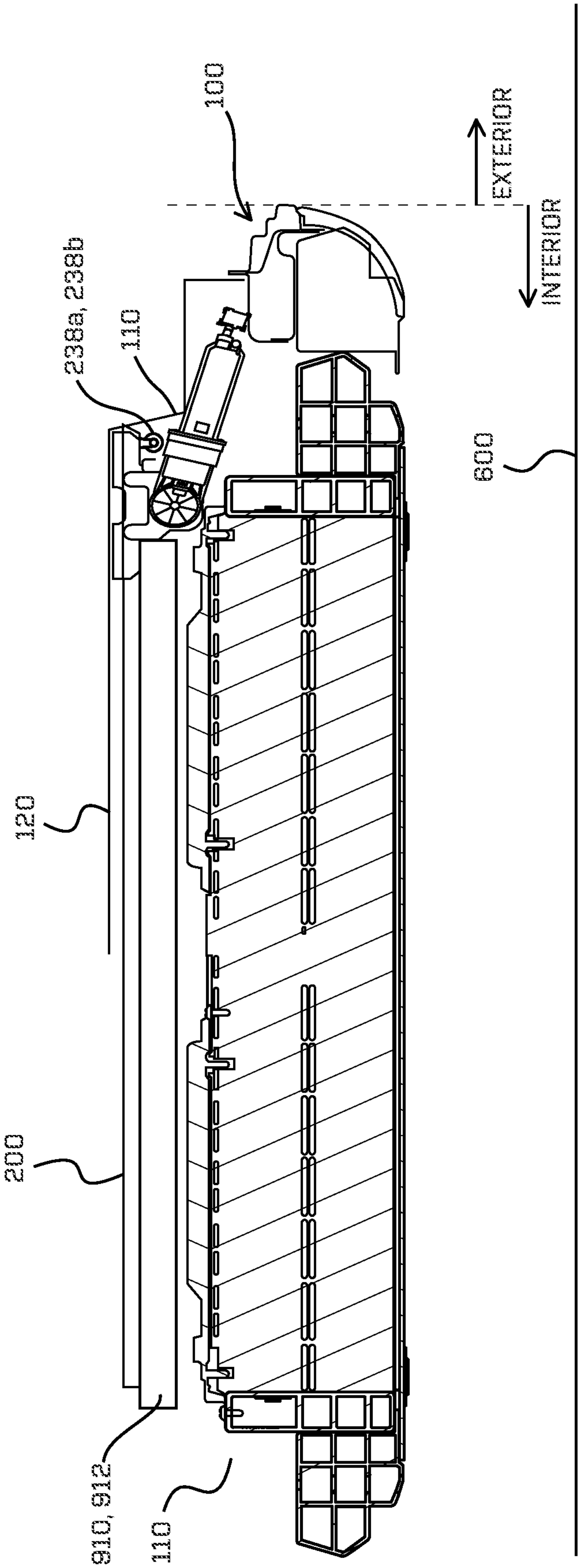
FIG. 5 is a partial cut away view illustrating the passenger assist entry-exit assembly of FIGS. 1-4 in which the assembly is coupled to a vehicle body and in a retracted position.
Figure 5A:
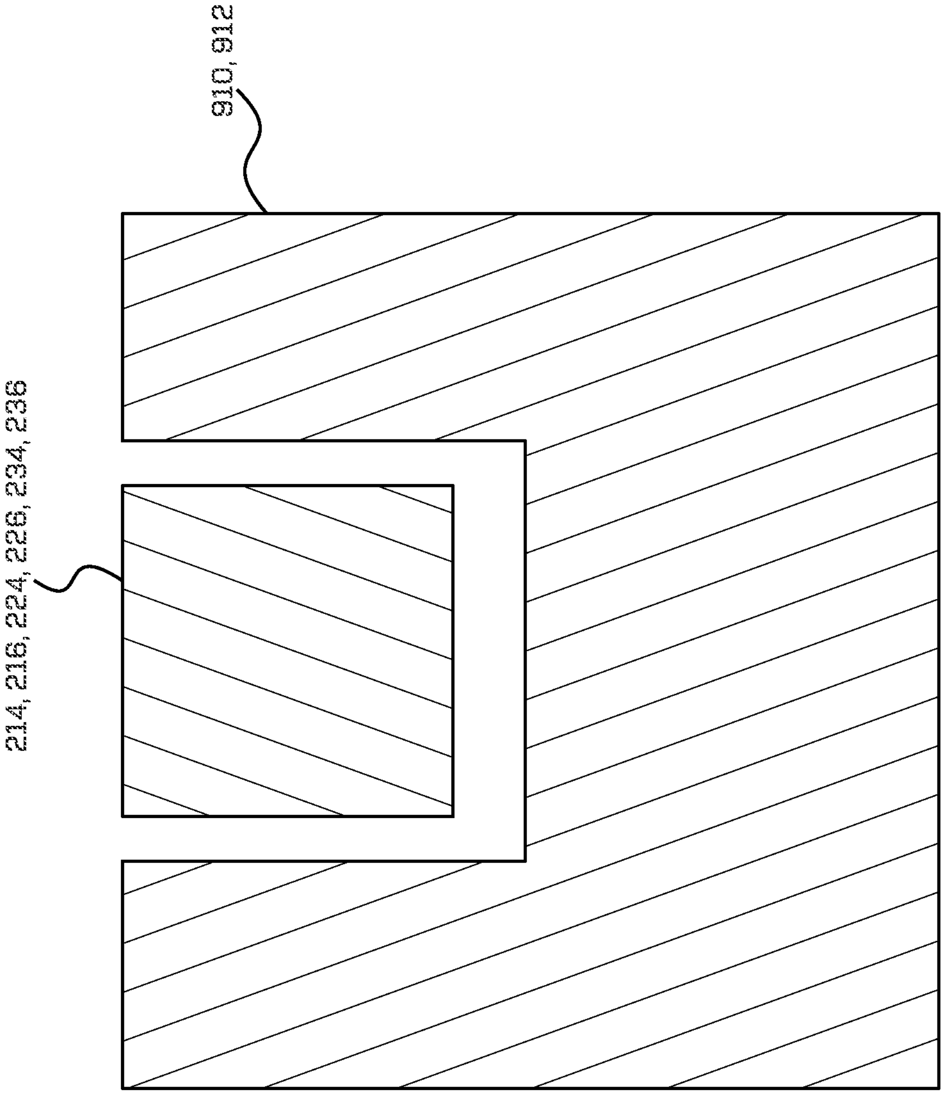
FIG. 5A is an enlarged cut away view illustrating one or more guide rails into which the passenger assist entry-exit assembly of FIGS. 1-5 may be moveable within the vehicle.

FIG. 1 is an exploded view of a passenger assist entry-exit assembly 200 according to an example of the present disclosure. FIG. 2 is a perspective view of a top side of the passenger assist entry-exit assembly 200 of FIG. 1. FIG. 3 is a perspective view of a bottom side of the passenger assist entry-exit assembly 200 of FIG. 1. FIG. 4 is a perspective enlarged view illustrating a step rotating actuator 262 (of a step actuator mechanism 260), and a portion of a second panel 220, a third panel 230 and a rotating plate or step member 232 (of third panel 330) of the passenger assist entry-exit assembly 200 of FIGS. 1-3, when assembly 200 is in a step forming deployed position. FIG. 5 is a partial cut away view illustrating the passenger assist entry-exit assembly 200 of FIGS. 1-4 in which the assembly is coupled to a vehicle body and in a retracted position. Thus, referring primarily to the example passenger assist entry-exit assembly 200 illustrated in FIG. 1 but also referring to FIGS. 2-5, examples of the present disclosure comprise a vehicle (shown partially in FIG. 5 and also discussed as vehicle 1102 with respect to FIG. 11) having a passenger assist entry-exit assembly 200 coupled or attached to a body 100 of the vehicle. In examples, the passenger assist entry-exit assembly 200 may be attached to body 100 of the vehicle by one or more brackets 270. In examples, the one or more brackets 270 may also be attached to at least a portion of the deployment actuator mechanism 240. In other examples, the assembly 200 may be attached to the vehicle via any other suitable structure or technique. Passenger assist entry-exit assembly 200 also may be guided within, and supported by, one or more guides, which in examples may be in the form of guide rails 910, 912 as illustrated in FIGS. 5A-10. The guides may be integral with or part of the body 100 of the vehicle, or be a separate component attached to the body 100 of the vehicle.

The body 100 of the vehicle may comprise a floor area 110. The floor area 110 may comprise a floor 120 onto which passengers may step to enter or exit an interior portion of the vehicle, e.g., enter or exit into a passenger seating area of the vehicle. The vehicle may have an interior/exterior (as indicated by arrows), which boundary between the interior/exterior may be defined by the body 100 and/or the floor area 110 of the body 100. It should be appreciated that the passenger assist entry-exit assembly 200 may be moveable from the deployed positions into the interior of the vehicle (or within the body 100 of the vehicle), and that as the passenger assist entry-exit assembly 200 moves out from under the floor 120 (or out from the interior of the vehicle) in the retraced position, it may pass through an area where one or more open doors (not shown) are located.

In examples, the floor area 110 and/or the floor 120 may comprise the same material as body 100. In various examples, body 100 may comprise carbon fiber. Body 100 and/or floor area 110 may comprise any material suitable to serve as a body and/or a floor of a vehicle, such as steel or aluminum. In various examples, floor area 110 may be separately attached to the body 100 or be formed as a single continuous or integral component of the body 100 extending generally upwards from a base of the body 100 towards the floor 120 onto which passengers may step. The term body herein is not limited to vehicles having a unibody construction. In some examples, the body may comprise vehicles having a body-on-frame construction and thus may comprise the vehicle body, the vehicle frame, or both the vehicle body and the vehicle frame. It should be appreciated that in various examples the term body may comprise any structure and arrangement suitable for including the features of vehicles having passenger assist entry-exit assemblies described herein.

Passenger assist entry-exit assembly 200 can comprise a first panel 210, a second panel 220, a third panel 230, a deployment actuator mechanism 240 and a step actuator mechanism 260. Second panel 220 may be rotatably coupled to first panel 210, for example, via pins or pulleys 703, 704. Third panel 230 may be rotatably coupled to second panel 220, for example, via pins or pulleys 701, 702.

First panel 210 may comprise a plate 212, a first bar 214 and a second bar 216. Plate 212 may be substantially flat and first and second bars 214, 216 may extend along and connect to the first and second lateral sides 410, 420, respectively, of passenger assist entry-exit assembly 200 (e.g., via any suitable fastening technique or device such as welding or a fastener). Plate 212 in various examples comprises a first side portion 212*a* and a second side portion 212*b* to which the first and second bars 214, 216 are connected, respectively. While side portions 212*a*. 212*b* are shown as separate or discontinuous pieces, it should be appreciated in various examples, plate 212 may be a single continuous piece rather than two separate side portions or pieces. In examples, the first and second side portions 212*a*, 212*b* may be connected, for example, along a center of plate 212 extending in a direction along a length of the assembly 200.

Second panel 220 may be rotatably coupled or attached to first panel 210 (e.g., via pins or pulleys 703, 704) and comprises a plate 222, a first bar 224 and a second bar 226. Plate 222 may be substantially flat and first and second bars 224, 226 may extend along, and connect to, the first and second lateral sides 410, 420, respectively, of the passenger assist entry-exit assembly 200 (e.g., via any suitable fastening technique or device such as welding or a fastener). Plate 222 in various examples comprises a first side portion 222*a* and a second side portion 222*b* to which the first and second bars 224, 226 are connected, respectively. While side portions 222*a*, 222*b* are shown as separate or discontinuous pieces, it should be appreciated that plate 222 may be a single continuous piece rather than two separate side portions or pieces. In examples, the first and second side portions 222*a*. 222*b* may be connected, for example, along a center of plate 222 extending in a direction along a length of the assembly 200.

Third panel 230 may be rotatably coupled or attached to second panel 220 (e.g., via pins or pulleys 701, 702) and comprise a rotating plate or step member 232, a first bar 234 and a second bar 236. Rotating plate or step member 232 may be substantially flat and first and second bars 234, 236 may extend along, and connect to, the first and second lateral sides 410, 420, respectively, of the passenger assist entry-exit assembly 200 (via any suitable fastening technique or mechanism such as welding or a fastener). Plate or rotating step member 232 in various examples comprises a first rotating side step portion 232*a* and a second rotating side step portion 232*b* to which the first and second bars 234, 236 are connected, respectively. While rotating side step portions 232*a*, 232*b* are shown as separate or discontinuous pieces, it should be appreciated that rotating step member or plate 232 may be a single continuous piece rather than two separate side portions or pieces and thus may rotate as a single rotating step member in various examples. In examples, the first and second side portions 232*a*, 232*b* may be connected, for example, along a center of plate 232 extending in a direction along a length of the assembly 200. It should be appreciated that in examples, bars 214, 216, 224, 226, 234, 236 may be connected to each other in any suitable manner in examples to creating structures extending along the first and second lateral sides 410, 420 of the assembly 200 that are movable within, and supported by the guides or guide rails 910, 912.

Third panel 230 may further comprise a first wheel 238*a* and a second wheel 238*b*. First and second wheels 238*a*, 238*b* may be attached to respective bars 234, 236. The wheels 238*a*, 238*b* assist in moving the passenger assist entry-exit assembly 200 from the step forming deployed position to the ramp forming deployed position by enabling the assembly 200 to be pushed along the ground 600 (Sec, FIGS. 7-9) on the wheels 238*a*, 238*b*. It should be appreciated that in various embodiments, wheels 238*a*, 238*b* may instead be a single wheel or more than two wheels. In examples, the one or more wheels may be attached anywhere on third panel 230 that enables the third panel 230 to be pushed along the ground 600 along with the connected second and first panels 220, 210 to move the assembly 200 from the step forming deployed position to the ramp forming deployed position. In other examples, the vehicle may not comprise any wheels at all. It should further be appreciated that the one ore more wheels of the present disclosure, like the bars 214, 216, 224, 226, 234, 236, may in various embodiments be guided within, and supported by, guides or guide rails 910, 912.

The passenger assist entry-exit assembly 200 may further comprise a plurality of pins 701-710. Pins 702, 704, 706, 708 and 710 may be attached to bars 216, 226, 236 on the second lateral side 420 of the passenger assist entry-exit assembly 200, while pins 701, 703, 705, 707 and 709 may be attached to bars 214, 224, 234 on the first lateral side 410 of the passenger assist entry-exit assembly. Pins 701-710, in examples, may be rotationally fixed relative to the plates and bars of each of the panels 210, 220 and 230 of passenger assist entry-exit assembly 200. In examples, at least some of pins 701-710 comprise pulleys having grooves into which an under surface of one of a first belt 246 or a second belt 248 is positioned and engaged, as discussed below. Each groove may be defined by two side faces of the pulley. The side faces are structured and arranged to aid in holding the first and second belts 246, 248 within the grooves of the pulley and to allow the pulley groove surfaces to pull or push the entire assembly 200, as discussed below. In the illustrated example, each of pins 701-710 comprise such pulleys and engage with either the first belt 246 or the second belt 248. It should be appreciated that each of plates 212, 222 and 232 of respective panels 210, 220 and 230 may be connected to their respective bars on each lateral side 410, 420 of the assembly 200 via additional pins (not labeled) or may be coupled to the bars using any other suitable structures or techniques (such as fasteners or welding).

Deployment actuator mechanism 240 may be coupled or attached to the body 100 of the vehicle via the one or more brackets 270. Thus, brackets 270 may also connect, or aid in coupling or connecting, the passenger assist entry-exit assembly 200 to the body 100 of the vehicle. It should be appreciated that the passenger assist entry-exit assembly 200 and deployment actuator mechanism 240 may be coupled to the body 100 of the vehicle using any other suitable means, such as any suitable mechanical coupling or connection. The one ore more guide rails 910, 912 in various examples enable the first, second and third panels 210, 220, 230 to be guided within, and movable along, the guide rails 910, 912. For example, a bottom portion of each of bars 214, 216, 224, 226, 234, 236 may fit and slide within a groove or channel defined in a respective guide rail 910, 912 as illustrated in the enlarged cut away illustration of FIG. 5A. The passenger assist entry-exit assembly 200 may be at least partially held or supported by the guide rails 910, 912 when located in the retracted position within the interior or inside the body 100 of the vehicle, for example. It should be appreciated that in various examples of the vehicles herein, no guide rail may exist at all, or the vehicle may have only a single guide rail. In examples, the single guide rail may cooperate with a passenger assist entry-exit assembly having bars and pulleys located on only one lateral side of the passenger assist entry-exit assembly and the assembly may comprise only a single deployment actuator, a single step actuator and a single belt.

Deployment actuator mechanism 240 may comprise the first belt 246 disposed on the first lateral side 410 of passenger assist entry-exit assembly 200 and the second belt 248 disposed on the second lateral side 420 of passenger assist entry-exit assembly 200. The first belt 246 may operate with the first panel 210, the second panel 230 and the third panel via the pins or pulleys 701, 703, 705, 707 and 709 attached to the first bars 214, 224, 234, which are disposed on the first lateral side 410 of the passenger assist entry-exit assembly 200. The second belt 248 similarly may operate with the first panel 210, the second panel 230 and the third panel via the pins or pulleys 702, 704, 706, 708 and 710 attached to the second bars 216, 226, 236, which are disposed on the second lateral side 420 of the passenger assist entry-exit assembly 200. First and second belts 246, 248 may comprise for example, rubber, PVC or urethane and may be flexible in various examples.

Deployment actuator mechanism 240 may further comprise a first deployment actuator 250 and a second deployment actuator 252. The first and second deployment actuators 250, 252 may be configured to engage with and move the first belt 246 and second belt 248, respectively. That is, the deployment actuators 250, 252, when actuated or activated, may cause the first and second belt 246, 248 to move the first panel 210, the second panel 220 and the third panel 230 together as a unit so that first panel 210, second panel 220 and third panel 230 can move from the retracted position to the step and ramp forming deployed positions, as discussed more below. In various examples, the deployment actuators 250, 252 may comprise an electric motor. Deployment actuators 250, 252 may in various examples comprise any actuator suitable for transforming energy into rotary or mechanical rotation or motion. Referring more specifically to FIG. 3, deployment actuators 250, 252 may further comprise respective axles 254, 256. Axle 256 may be rotationally coupled to the rotary output of deployment actuator 252 such that when actuator 252 is actuated or activated, axle 256 rotates. Axle 254 may be similarly rotationally coupled to the rotary output of deployment actuator 250 such that when actuator 250 is activated or actuated, axle 254 rotates. Axles 254 and 256 may each comprise a pin or pulley 254*a*, 256*a* that is rotationally fixed to a respective end of axles 254, 256. The pulleys or pins 254*a*. 256*a* may comprise faces that define a groove therebetween that aid in holding or engaging the belts 246, 248. The belts 246, 248 may be rotated at least in part by the underside of the belts 246, 248 engaging with the surface of grooves of pulleys 254*a*, 256*a*. It should be appreciated that in various examples, the deployment actuator mechanism 240 may comprise only a single belt and a single deployment actuator having a single axle that rotates and engages the belt. The single belt and single deployment actuator each may be disposed on only one lateral side of the passenger assist entry-exit assembly 200.

The passenger assist entry-exit assembly 200 may further comprise a leaf or additional plate 219. Leaf 219 may be substantially flat and have a bottom surface that conforms in shape at least in part to an upper surface or shape of plate 212 of the first panel 210 so that the leaf 219 may rest on top of the plate 212 in a cooperating fashion. The leaf 219 may have a first side portion 219*a* and a second side portion 219*b*. Leaf 219 may have bars 217, 218 disposed on the first 410 and second 420 lateral sides, respectively, of passenger assist entry-exit assembly 200. While side portions 219*a*, 219*b* are shown as separate or discontinuous pieces, it should be appreciated that leaf 219 may be a single continuous piece rather than two separate side portions or pieces. In examples, the first and second side portions 219*a*, 219*b* may be connected, for example, along a center of leaf 219 extending in a direction along a length of the assembly 200.

The leaf 219 may be positioned above or on top of the passenger assist entry-exit assembly 200 when the assembly 200 is located in the interior of the vehicle in the retracted position, under the floor 120 of body 100, for example. The leaf 219 may be slidably engageable with the first panel 210 (e.g., via bars 217, 218 sliding in guides) to allow the passenger assist entry-exit assembly 200 to deploy a greater length for the ramp forming deployed position, as discussed more below with respect to FIGS. 9 and 10. In examples, leaf 219 may comprise an engagement structure as a stop or a hook that extends substantially downwardly from a back end portion of the leaf 219 and is arranged so as to be engageable with the plate 212 of first panel 210 so that when the plate 212 (and the other two panels 220, 230) engages with the engagement member, the plate 212 will move in tandem with the leaf 219 as the passenger assist entry-exit assembly 200 moves from the ramp deployed position back to the step forming deployed position and back to the retracted position. The leaf 219 and its slidable engagement with the first panel 210 thus provides a greater length for the ramp in the ramp forming deployed position and a smaller length for the assembly 200 in the retracted position where physical constraints of the vehicle (e.g., the width from one side door entry to another side door entry) may not allow for the full length provided by leaf 219. In various examples, the vehicles and passenger assist entry-exit assemblies of the present disclosure may not have any leaf or additional plate at all.

Referring now more specifically to FIG. 4, FIG. 4 illustrates components of the third panel 230 and the step actuator mechanism 260 disposed on one lateral side of the passenger assist entry-exit assembly 200. In particular, the step actuator mechanism 260 may comprise a first step rotating actuator 262 and a first bracket 264. In various examples, the first step rotating actuator 262 may comprise an electric motor. The first step rotating actuator 262 may in various examples comprise any actuator suitable for transforming energy into rotary or mechanical rotation or motion. First bracket 264 may comprise a first portion 264*a* (e.g., a first end portion) rotatably fixed to the first step rotating actuator 262 and a second portion 264*b* (e.g., an opposite end portion) fixed to the first rotating side step portion 232*a*. The third panel 230 may comprise a first pivot coupling 239, a slot 234*a* and a first linkage 298. The slot 234*a* may be defined in, located in, or part of the first bar 234, which extends on the first lateral side 410 of the assembly 200. The first linkage 298 may be disposed on the first lateral side 410 of the assembly 200 and comprises a first end portion 298*a* and a second end portion 298*b*. The first end portion 298*a* may be fixed to the first rotating side step portion 232*a* and the second end portion 298*b* may be coupled to the first bar 234 and comprise a pin 238*c* movable within the slot 234*a* of first bar 234. The first step rotating actuator 262 may be configured to rotate the first bracket 264 to cause the second portion 264*b* of first bracket 264 to pivot about the first pivot coupling 239, thereby causing the first rotating side step portion 232*a* to rotate while the pin 238*c* of the first linkage 298 moves within the slot 24*a* of the first bar 234 to form the step for the step forming deployed position.

It should be appreciated from the foregoing that, while not specifically illustrated in FIG. 4, the passenger assist entry-exit assembly 200 may comprise components that are substantially the same or identical to the components of FIG. 4 but that disposed on the opposite lateral side of the passenger assist entry-exit assembly 200 (i.e., on the second lateral side 420 of the assembly 200). That is, on the opposite lateral side of passenger assist entry-exit assembly 200, the step actuator mechanism 260 may further comprise a second step rotating actuator 265 (illustrated in FIG. 3) and a second bracket. In various examples, the second step rotating actuator 265 may comprise an electric motor. The second step rotating actuator 265 may in various examples comprise any actuator suitable for transforming energy into rotary or mechanical rotation or motion. The second bracket may comprise a first portion (e.g., a first end portion) rotatably fixed to the second step rotating actuator 265 and a second portion (e.g., an opposite end portion) fixed to the second rotating side step portion 232*b*. The third panel 230 may further comprise a second pivot coupling, a slot 236*a* (See, FIG. 1) and a second linkage. The slot 236*a* may be defined in, located in, or be part of the second bar 236, which extends on the second lateral side 420 of the assembly 200. The second linkage may be disposed on the second lateral side 420 of the assembly 200 and comprise a first end portion and a second end portion. The first end portion may be fixed to the second rotating side step portion 232*b* and the second end portion may be coupled to the second bar 236 and comprise a pin movable within the slot 236*a* of second bar 236. The second step rotating actuator 265 may be configured to rotate the second bracket to cause the second end portion of the second bracket to pivot about the second pivot coupling, thereby causing the second rotating side step portion 232*b* to rotate while the pin of the second linkage moves within the slot 236*a* of the second bar 234 to form the step for the step forming deployed position. It should be appreciated that the first and second step rotating actuators 262 and 265 may operate to rotate the first plate or rotating step member 232, whether that rotating step member 232 is a single integral or continuous piece or separate pieces or portions. In various examples, the step rotating actuators and the step actuator mechanisms herein may comprise a single rotating actuator, and the components in FIG. 4 for operating the step member may be located on only one lateral side of the passenger assist entry-exit assembly 200. That is, in some examples, the passenger assist entry-exit assembly 200 may not have identical components of those described for FIG. 4 located on an opposite lateral side passenger assist entry-exit assembly 200.

It should be appreciated from that the step actuator mechanism 260 may be controlled by the vehicle (e.g., via the vehicle computing device(s) 114 discussed with respect to FIG. 11 below) so as to rotate the step rotating actuator(s) a preset rotational amount that ensures step member 232 stops at a position that is substantially horizontal, or substantially parallel, with the surface on which the vehicle is travelling, or is parked. Such horizontal position ensures that any load placed on the step member 232 (e.g., a passenger stepping onto the step member 232) will not cause the pins located within slots of respective side bars to move downwardly within the slots. In examples, the vehicle may comprise sensor system(s) and suspension system (discussed with respect to FIG. 11 below) that are utilized to understand a distance between ground and the body 100 of the vehicle (e.g., the distance from a floor area 110 of the body 100 to the ground) and to control the suspension system to position the body 100 or floor area 110 at a preset or predetermined height or distance from the ground. Knowing or controlling such height or distance may enable the vehicle to precisely control or determine a preset amount to rotate the step rotating actuator(s) to ensure that the step member 232 stops rotating when it is close to, or substantially in, a horizontal position and so that any load placed on the step member 232 (e.g., a passenger stepping onto the step member 233) does not cause the pins located within slots of respective side bars to move downwardly within the slots.

Turning now to FIGS. 5-10 and the deployment and retraction operation of passenger assist entry-exit assembly 200, FIG. 5 illustrates the passenger assist entry-exit assembly 200 in the retracted position under the floor 120 of the vehicle body 100 (or floor area 110). It should be appreciated that the passenger assist entry-exit assembly 200 of FIGS. 6-10 is the same as the assembly 200 described and illustrated in FIGS. 1-4. Like elements are thus identified with the same reference numerals. The description of those elements applies to like element numbers in FIGS. 5-10. It should also be appreciated that some elements shown and described in FIGS. 1-4 have been omitted from FIGS. 5-10 for ease of reference and illustration. In the retracted position illustrated in FIG. 5, the assembly 200 may be located at least substantially within an interior or body 100 and/or under the floor 120 of the vehicle and may not be visible to a passenger. It should be appreciated, however, that in various examples of the retracted position, less than all of the components of the assembly 200 (or all of the components of the assembly 200) may be located outside from under the floor 120 and/or outside the interior of the vehicle and visible to a passenger.

Figure 6:
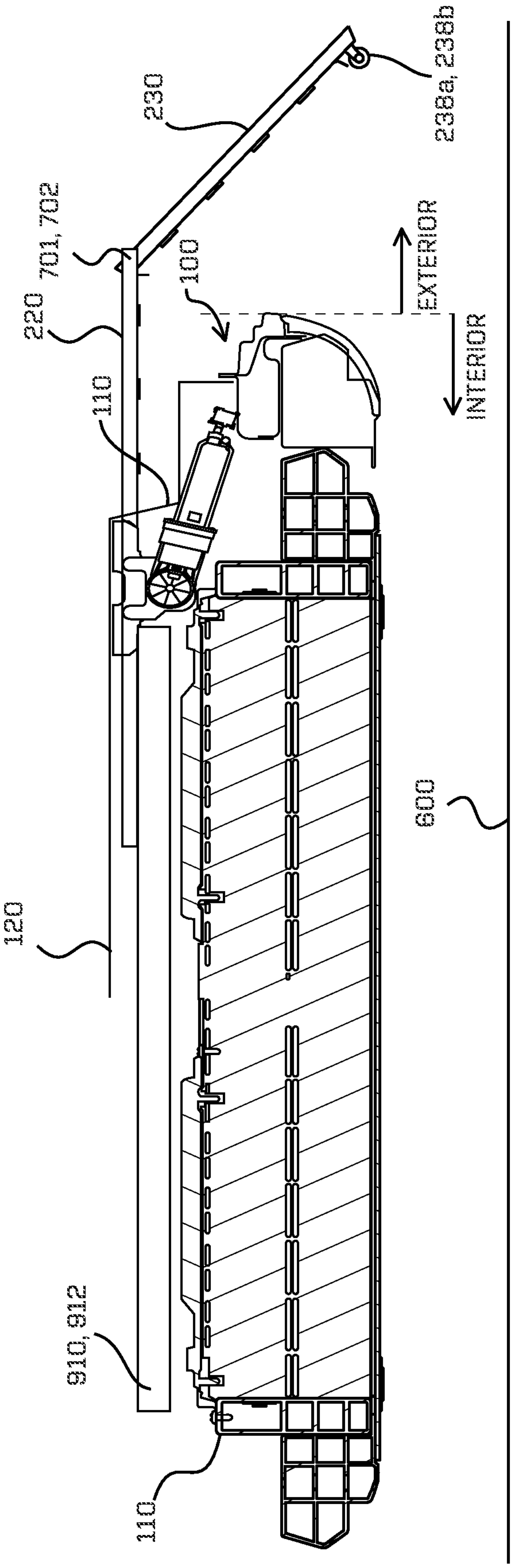
FIGS. 6-8 are partial cut away views illustrating the passenger assist entry-exit assembly of FIGS. 1-5 coupled to a vehicle body and moving from the retracted position to the step forming deployed position.

To move at least a portion of the passenger assist entry-exit assembly 200 from the retracted position illustrated in FIG. 5 to a deployed position, the vehicle may actuate the deployment actuator mechanism 240 (e.g., via the vehicle computing device(s) 1104 discussed below). The activation of deployment actuator mechanism 240 may cause deployment actuators 250, 252 to actuate or activate, thereby rotating axles 254, 256 in a first, pushing rotational direction. The rotation of axles 254, 256 in the pushing direction causes the belts 246, 248 to move within the grooves of pulleys 701-710. The frictional engagement of the underside surface of the belts 246, 248 with the surface of the grooves of pulleys 701-710, which are rotationally fixed to the respective plates and bars of panels 210, 220, 230, may move the first 210, second 220 and third panels 230 in a direction away from the vehicle (i.e., towards the exterior of the vehicle) and out from under the floor 120. When the first 210, second 220 and third panels 230 are pushed or moved towards the exterior of the vehicle and the third panel 230 is moved entirely outside from under the floor 120 and outside the body 100 (and outside of an interior of the vehicle), the third panel 230 may rotate downwardly towards the ground 600 relative to the second panel 220 about pins 701, 702 as illustrated in FIG. 6. More specifically, the first and second rotating side step portions 232*a*. 232*b* may be caused to rotate downwardly relative to the second panel 230 about pins 701, 702 located on the first lateral side of the assembly 200. In examples, the rotation of third panel 230 downwardly relative to the second panel 220 may be due merely to gravity. That is, once the third panel 230 reaches a position in which the body 100 and/or the guide rails 910, 912 are no longer holding or supporting the third panel 230 in a substantially horizontal position and a position that is substantially linearly aligned with the second panel 220, the third panel 230 may rotate downwardly about pins 701, 702 due to gravity. In other examples, the rotation of third panel 230 downwardly relative to the second panel 220 may occur when the vehicle (e.g., via the vehicle computing device(s) 1104) selectively activates or actuates a mechanism of assembly 200 that allows third panel 230 to rotate downwardly relative to second panel 220. For example, the vehicle may cause the activation or actuation of one or more electrically actuatable clutch(es) or electro-magnet(s) that are part of the assembly 200, which releases the third panel 230 from being rotationally fixed relative to second panel 220, thereby enabling the third panel 230 to rotate relative to the second panel 220 about pins 701, 702. It should be appreciated that the assemblies 200 and vehicles herein may comprise any suitable mechanism(s) that allow for selective relative rotation of third panel 230 relative to second panel 220.

Figure 7:
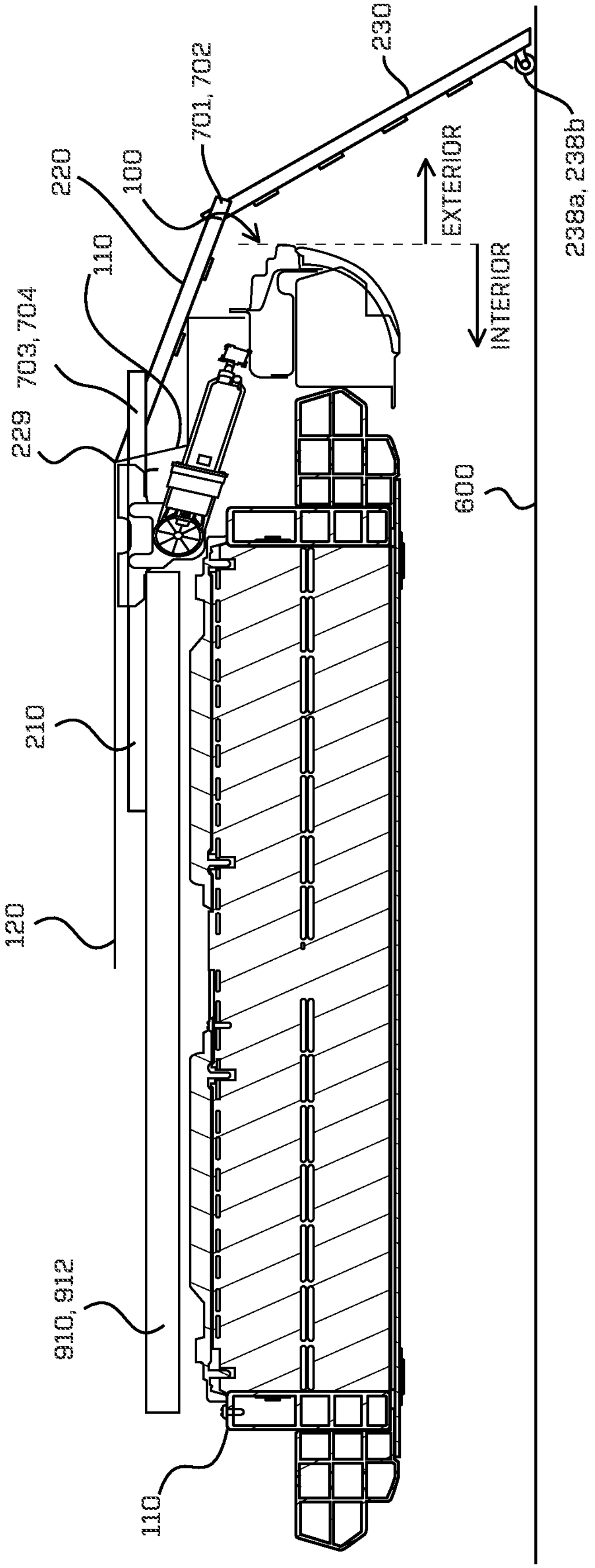

When the first, second, and third panels 210, 220 and 230 are pushed or moved further towards the exterior of the vehicle and the second panel 230 is moved entirely outside from under the floor 120 (or outside the vehicle interior or outside the body 100 of the vehicle), the second panel 220 may rotate downwardly towards the ground 600 relative to the first panel 210 about pins 703, 704 as illustrated in FIG. 7. In examples, the rotation of second panel 220 downwardly relative to the first panel 210 may be due merely to gravity. That is, once the second panel 220 reaches a position in which the body 100 and/or the guides rails 910, 912 are no longer holding or supporting the second panel 220 in a substantially horizontal position and a position that is substantially linearly aligned with the first panel 210, the second panel 220 may rotate downwardly due to gravity. In other examples, the rotation of the second panel 220 downwardly relative to the first panel 210 may occur when the vehicle selectively activates or actuates (e.g., via the vehicle computing device(s) 1104) a mechanism of assembly 200 that allows second panel 220 to rotate downwardly relative to first panel 210. For example, the vehicle may cause the activation or actuation of one or more electrically actuatable clutch(es) or electro-magnet(s) that may be part of the assembly 200, which releases second panel 220 from being rotationally fixed relative to first panel 210, thereby enabling the second panel 220 to rotate relative to first panel 210 about pins 703, 704. It should be appreciated that the assemblies 200 and vehicles herein may comprise any suitable mechanism(s) that allow for selective relative rotation of third panel 230 relative to second panel 220.

Figure 8:
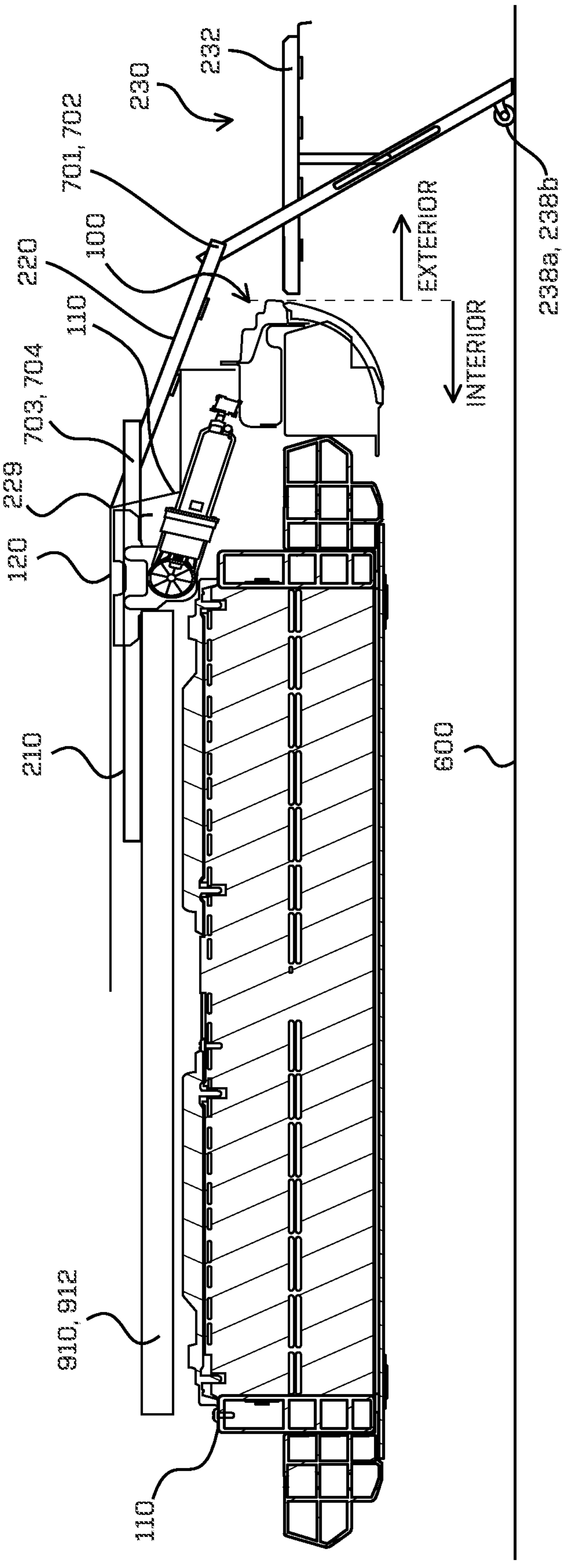

As the second and third panels 220, 230 are pushed or moved out of the interior of the vehicle towards the exterior and the second and third panels 220, 230 are moved entirely from outside of under the floor 120 (or entirely outside the interior or outside of the vehicle body 100), the third panel 230 touches the ground 600. That is, at least wheels 238*a*, 238*b* (or a single wheel or more than two wheels in other examples) may touch the ground 600, as illustrated in FIGS. 7 and 8. In some examples, as mentioned above, the assembly 200 may not comprise wheels at all and the bars and/or a different suitable mechanical component of the assembly 200 may touch the ground. It should thus be appreciated that FIGS. 7 and 8 illustrate the passenger assist entry-exit assembly 200 in the step forming deployed position. In this position (or at some point prior to this position), the vehicle may actuate the step actuator mechanism 260 to cause the step member 232 to rotate and form the step for the step forming deployed position. In the step forming deployed position illustrated in FIG. 8, the assembly 200 may form a step onto which a passenger may step to exit or enter the vehicle. In various examples, when the step deployment position is desired, the vehicle may control the passenger assist entry-exit assembly 200 to stop the rotation of the step member at a position or angle in which the step member 232 is substantially even with the level of a curb. By deploying the assembly 200 so that rotating step member 232 rotates to a position substantially even with a curb, the passenger assist entry-exit assembly 200 may comply with requirements of the American with Disabilities Act ("ADA"). It should be appreciated that, in the step forming deployed position, the pivot location of pins 703, 704 and the angle of second panel 220 relative to first panel 210 is such that an edge 229 of second panel 220 forms a smooth and/or flush transition with either the floor 120, the floor area 110 or the body 100 of the vehicle so that no bump, discontinuity or protrusion is formed at the point where edge 229 of panel 220 meets the floor 120, the floor area 110 and/or the body 100 of the vehicle. This smooth or flush transition prevents a passenger entering or exiting the vehicle from tripping on any such bump or protrusion.

Figure 9:
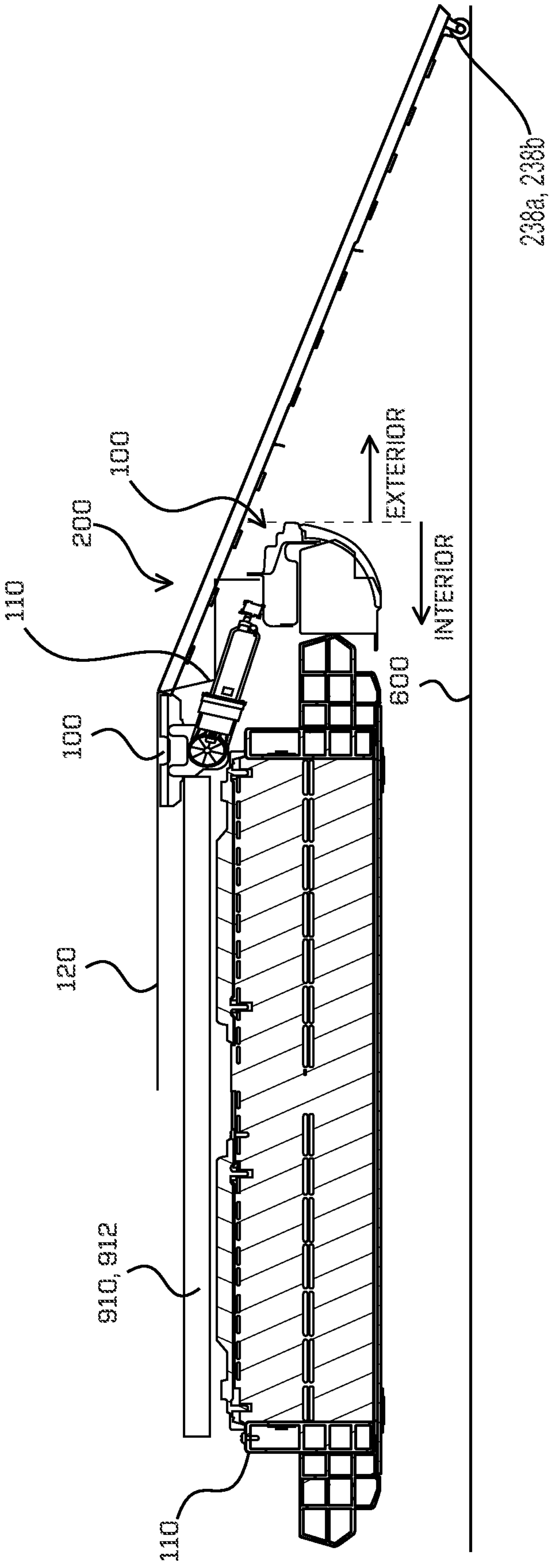
FIGS. 9 and 10 are partial cut away views illustrating the passenger assist entry-exit assembly of FIGS. 1-5 coupled to a vehicle body in a ramp forming deployed position.

To move the passenger assist entry-exit assembly 200 from the step forming deployed position to the ramp forming deployed position, the vehicle may actuate the deployment actuator mechanism 240. If it is desired that the assembly 200 move directly from the retracted position to the ramp forming deployed position, it should be appreciated that the actuation may be the same or continuous actuation as the actuation described above that moved the assembly 200 to the step forming deployed position. The actuation of deployment actuator mechanism 240 causes the deployment actuators 250, 252 to rotate axles 254, 256 in the pushing rotational direction. This actuation causes the panels 210, 220, 230 to move further in the direction away from the exterior of the vehicle. In particular, the assembly 200 may be pushed along the ground 600 on first and second wheels 238*a*, 238*b* (or one wheel or more than two wheels) away from the vehicle body 100 or exterior of the vehicle. As the assembly 200 is pushed further along the ground 600, the second and third panels 220, 230 may rotate about pins 701-704 in a rotational direction as the assembly 200 moved towards the step forming deployed position (i.e., the panels 220, 230 rotate upwardly and away from the ground 600) until the panels 220, 230 are substantially linearly aligned with each other and with the first panel 210. The assembly 200 thus forms a ramp onto which a passenger may walk upon exiting or entering the vehicle, as illustrated in FIG. 9. In various examples, it should be understood that when the ramp deployment mode is desired, the vehicle may control (e.g., via the vehicle computing device(s) 1104) the passenger assist entry-exit assembly 200 so that the third panel 230 first touches a curb and thus moves along a ground at curb height. By deploying the assembly so that the third panel moves along the ground at curb height, the passenger assist entry-exit assembly 200 may comply with requirements of the American with Disabilities Act ("ADA").

Figure 10:
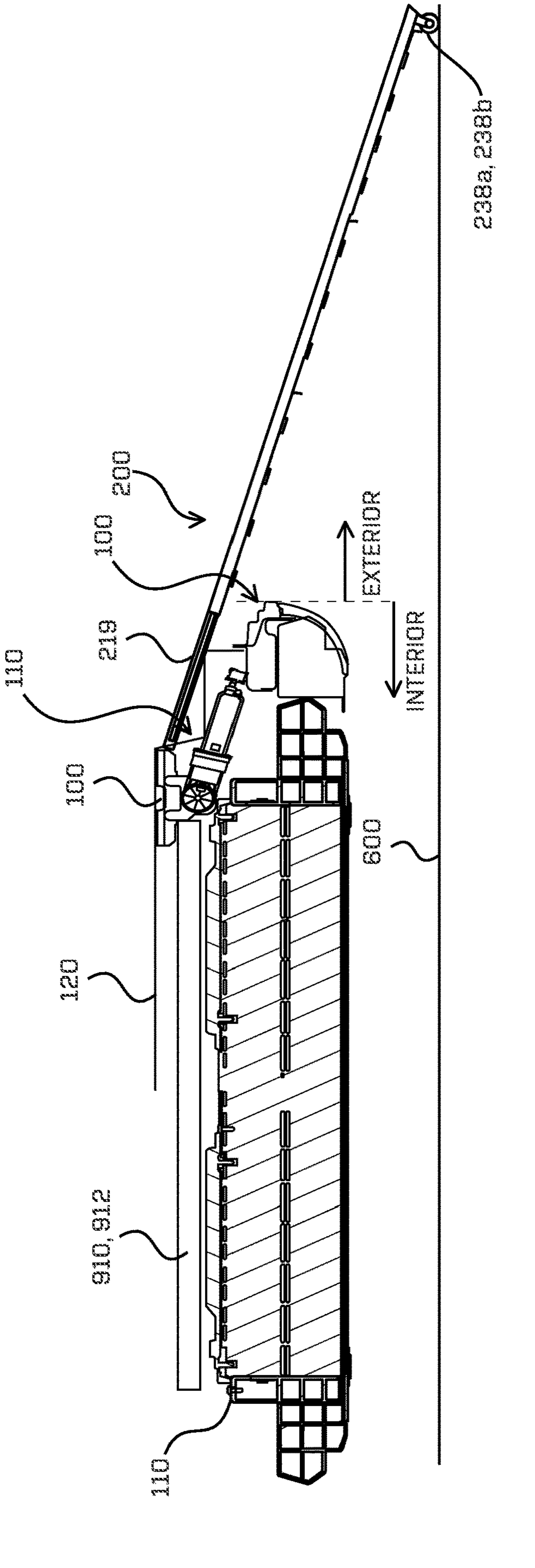

In some examples, the vehicle may further actuate (or continue to actuate) the deployment actuator mechanism 240 (e.g., actuators 250, 252) to rotate axles 254, 256 in the pushing rotational direction to move the panels 210, 220, 230 further in the direction away from the vehicle and to cause the ramp to extend in length for the ramp forming deployed position. In particular, the actuation of deployment actuator 240 can further cause the first panel 210 to slide or move relative to the leaf 219 positioned on top of first panel 210. That is, the assembly 200 may be pushed further along the ground 600 on first and second wheels 238*a*, 238*b* (or one wheel or more than two wheels) away from the vehicle, which causes the first panel 210 to slide out from under the leaf 219, making leaf 219 form a portion of the ramp upon which a passenger can walk to enter or exit the vehicle, as illustrated in FIG. 10 (i.e., the leaf 219, and the first, second and third panels 210, 220, 230 are substantially linearly aligned to form the ramp).

To move the assembly 200: (a) from the ramp forming deployed position (e.g., the ramp forming deployed position shown in FIGS. 9 and 10) back to the retracted position, or (b) from the ramp forming deployed position back to the step forming deployed position (e.g., the step forming deployed position shown in FIGS. 7 and 8) or (c) from the step forming deployed position back to the retracted position, the vehicle may actuate or activate the deployment actuator mechanism 240 (e.g., via the vehicle computing device(s) 1104) to cause the deployment actuators 250, 252 to rotate axles 254, 256 in a rotational direction that is opposite to the first pushing rotational direction, i.e., in a second pulling rotational direction. The rotation of axles 254, 256 in the pulling direction may cause the belts 246, 248 to move within the grooves of pulleys 701-710 in an opposite direction of the pushing direction. The frictional engagement of the underside surface of belts 246, 248 moving in the pulling direction with the surface of the grooves of pulleys 701-710 (which are rotationally fixed to the respective plates and bars of the panels 210, 220, 230), may move the first, second and third panels 210, 220, 230 in a direction towards the interior of the vehicle in a manner opposite to how the panels 210, 220, 230 moved while being deployed. That is, if the third panel 230 is in the ramp forming deployed position illustrated in FIG. 9 or FIG. 10, as the assembly 200 moves towards the interior of the vehicle (or vehicle body 100), the third and second panel 230, 220 may each rotate back downwardly away from the ground 600. And as the assembly 200 moves from the step forming deployed position to the retracted position, the second and third panels 220, 230 will rotate upwardly away from the ground 600 until the second and third panel 220, 230 are substantially linearly aligned with the first panel 210 so that the first, second and third panels 210, 220, 230 move as a singular and linearly aligned unit back into the retracted position under the floor 120 of the vehicle (or at least substantially within the body 100 or interior of the vehicle). It should be appreciated that in examples in which the rotation of the second and third panels 220, 230 upwardly and downwardly occurs via the vehicle selectively actuating a mechanism to allow such relative rotation, the movement of assembly 200 from the ramp forming deployed position to the retracted position may not involve any relative rotation of second and third panel 220, 230 because the panels 210, 220, 230 may be held in a substantially linearly aligned position due to the vehicle not having selected to allow relative rotation of the second and third panels 220, 230 (e.g., the mechanism of assembly 200, such as the clutch(es) or electro-magnet(s), may not have been actuated). It should further be appreciated that when the assembly 200 moves from the position illustrated in FIG. 10 to the position illustrated in FIG. 9, the first panel 210 will move or slide relative to leaf 219 until the first panel 210 engages the engaging structure of leaf 219, whereby the first panel 210 will move in tandem or together with leaf 219. In some examples, the engagement structure of leaf 219 may comprise a lock, a stop or a hook to which the plate 212 of first panel 210 locks, stops or hooks as the first panel 210 moves from the position of FIG. 10 to the position of FIG. 9. Thus, the engagement of first panel 210 to the engagement structure of leaf 219, causes leaf 219 and first panel 210 to move as a single unit with both the second and third panels 220, 230. When the first panel 210 is located under the leaf 219 and moves therewith, it should be appreciated that the assembly 200 may have a shorter length then when fully deployed as a ramp with the leaf 219, thereby enabling the assembly 200 to be placed within a vehicle having particular size constraints (e.g., constraints from one side door entry to another side door entry). Conversely, the movement of assembly 200 to the ramp deployed position of FIG. 10 in which the leaf 219 serves as part of the ramp, enables the vehicle to provide a longer length for the ramp.

Figure 11:
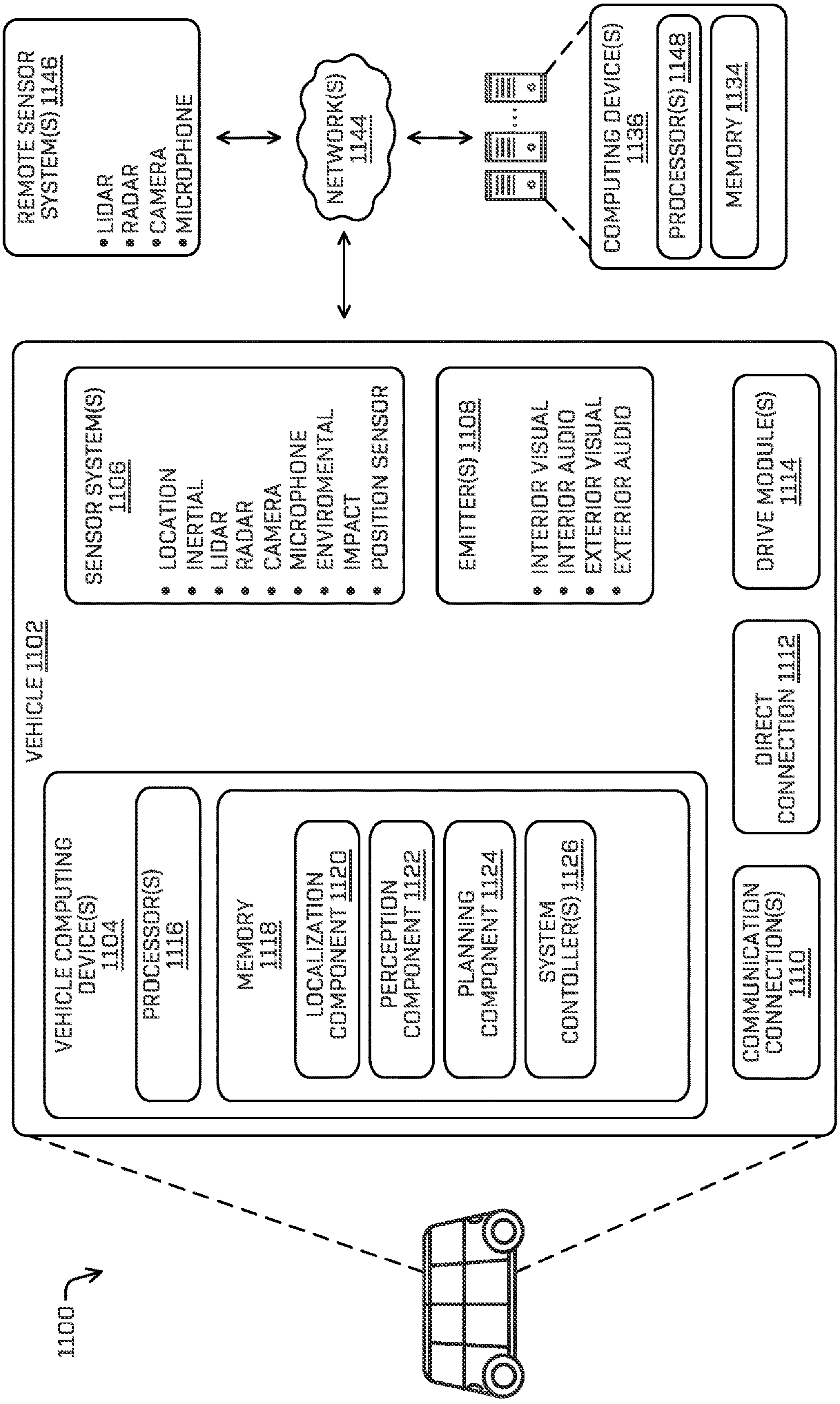
FIG. 11 is a block diagram illustrating an example system for controlling a vehicle having a passenger assist entry-exit assembly according to various examples of the present disclosure.

FIG. 11 is a block diagram of an example system 1100 for implementing techniques or functions of any vehicle utilizing the various example passenger entry-exit assemblies of the present disclosure. The system 1100 may include a vehicle 1102, which may include a vehicle computing device 1104, one or more sensor systems 1106, one or more emitters 1108, one or more communication connections 1110, at least one direct connection 1112, and one or more drive modules 1114.

Vehicle computing device 1104 may include one or more processors 1116 and memory 1118 communicatively coupled with the one or more processors 1116. Vehicle 1102 may include any type of vehicle including an autonomous vehicle or a semi-autonomous vehicle. In the illustrated example, the memory 1118 of vehicle computing device 1104 stores a localization component 1120, a perception component 1122, a planning component 1124, and one or more system controllers 1126. Though depicted in FIG. 8 as residing in the memory 1118, it is contemplated that the localization component 1120, the perception component 1122, the planning component 1124, and the system controllers 1126 may additionally, or alternatively, be accessible to the vehicle 1102 (e.g., stored on, or otherwise accessible by, memory remote from the vehicle 1102, such as, for example, on memory 1134 of a remote computing device 1136).

In at least examples, the localization component 1120 may include functionality to receive data from the sensor system(s) 1106 to determine a position and/or orientation of the vehicle 1102 (e.g., one or more of an x-, y-, z-position, roll, pitch, or yaw). For example, the localization component 1120 may include and/or request/receive a map of an environment and can continuously determine a location and/or orientation of the autonomous vehicle within the map.

In some examples, the perception component 1122 may include functionality to perform object detection, segmentation, and/or classification. In general, the planning component 1124 may determine a path for the vehicle 1102 to follow to traverse through an environment.

In at least some examples, the vehicle computing device 1104 may include one or more system controllers 1126, which may be configured to control steering, propulsion, braking, safety, emitters, communication, and other systems of the vehicle 1102. The system controller(s) 1126 may communicate with and/or control corresponding systems of the drive module(s) 1114 and/or other components of the vehicle 1102.

As can be understood, the components discussed herein (e.g., the localization component 1120, the perception component 1122, the planning component 1124, the one or more system controllers 1126) are described as divided for illustrative purposes. However, the operations performed by the various components can be combined or performed in any other component.

In some instances, aspects of some or all of the components discussed herein can include any models, algorithms, and/or machine learning algorithms. For example, in some instances, the components in the memory 1118 (and the memory 1134, discussed below) can be implemented as a neural network. As can be understood in the context of this disclosure, a neural network can utilize machine learning, which can refer to a broad class of such algorithms in which an output is generated based on learned parameters. Although discussed in the context of neural networks, any type of machine learning can be used consistent with this disclosure.

In at least examples, the sensor system(s) 1106 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. In various examples, the sensor system(s) 1106 may include a position sensor configured to determine whether a passenger is seated in a seat assembly. In some examples, the position sensor may include a weight switch configured to determine whether a weight is located on the seat assembly. The weight may include a minimum weight associated with a passenger (e.g., 50 pounds, 25 kilograms, 100 pounds, etc.). In various examples, the position sensor may include an image capture device and/or other perception sensor. In such examples, the image capture device and/or other perception sensor may send sensor data to the vehicle computing device to analyze and determine whether the object in the seat assembly is a passenger (e.g., whether it is a human or other live animal). In various examples, the sensor system(s) may detect information regarding a height or distance of the vehicle body (i.e., the bottom of the vehicle body) from the ground or surface on which the vehicle is traveling or is parked.

The sensor system(s) 1106 can include multiple instances of each of these or other types of sensors. For instance, the LIDAR sensors can include individual LIDAR sensors located at the corners, front, back, sides, and/or top of the vehicle 1102. As another example, the camera sensors can include multiple cameras disposed at various locations about the exterior and/or interior of the vehicle 1102. The sensor system(s) 1106 can provide input to the vehicle computing device 1104. Additionally or alternatively, the sensor system (s) 1106 may send sensor data, via the one or more networks 1144, to the one or more computing device(s) 1136 at a particular frequency, after a lapse of a predetermined period of time, in near real-time, etc.

The vehicle 1102 may also include one or more emitters 1108 for emitting light and/or sound. The emitters 1108 in this example include interior audio and visual emitters to communicate with passengers of the vehicle 1102.

The vehicle 1102 may also include one or more communication connection(s) 1110 that enable communication between the vehicle 1102 and one or more other local or remote computing device(s). For instance, the communication connection(s) 1110 can facilitate communication with other local computing device(s) on the vehicle 1102 and/or the drive module(s) 1114. Also, the communication connection(s) 1110 can allow the vehicle to communicate with other nearby computing device(s) (e.g., computing device(s) 1136, other nearby vehicles, etc.) and/or one or more remote sensor system(s) 1146 for receiving sensor data.

The communications connection(s) 1110 may include physical and/or logical interfaces for connecting the vehicle computing device 1104 to another computing device or a network, such as network(s) 1144. For example, the communications connection(s) 1110 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In various examples, the vehicle 1102 may include one or more drive modules 1114. In some examples, the vehicle 1102 can have a single drive module 1114. In at least examples, the drive module(s) 1114 may include one or more sensor systems to detect conditions of the drive module(s) 1114 and/or the surroundings of the vehicle 1102. By way of example and not limitation, the sensor system(s) can include cameras or other image sensors, ultrasonic sensors to acoustically detect objects in the surroundings of the drive module, LIDAR sensors, radar sensors, etc. Some sensors, such as the wheel encoders can be unique to the drive module(s) 1114. In some cases, the sensor system(s) on the drive module(s) 1114 can overlap or supplement corresponding systems of the vehicle 1102 (e.g., sensor system(s) 1106).

The drive module(s) 1114 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., a cooling system, safety systems, actuator mechanisms such as deployment actuator mechanism 240 and step actuator mechanism 260 for the passenger assist entry-exit assemblies described herein, onboard charging system, other electrical components such as a DC/DC converter, a high voltage junction, a high voltage cable, charging system, charge port, etc.).

In various examples, the vehicle computing device 1104 may control the deployment and retraction of the passenger entry-exit assemblies described herein. For example, the vehicle computing device 1104 may determine when or control when to activate the deployment actuator mechanism 240 and/or the step actuator mechanism 260 and their respective one or more actuator(s). In examples, the vehicle computing device 1104 may actuate the deployment actuator mechanism 240 and/or the step actuator mechanism 260 based upon passenger input (e.g., a passenger pressing an input device on the vehicle). In other examples, the vehicle computing device 1104 may automatically activate the deployment actuator mechanism 240 based upon a predetermined condition (e.g., the vehicle 1102 starting or stopping, the vehicle doors opening or closing), a predetermined schedule (e.g., a waste management cycle, a recharging cycle or a cleaning cycle of vehicle 1102), or when the vehicle 1102 knows that a particular type of passenger will be entering or exiting the vehicle 1102 (e.g., the vehicle 1102 may know an elderly or paraplegic person is or will be travelling in the vehicle 1102 and computing device 1104 may cause the vehicle 1102 in such instance to automatically deploy a ramp deployment position). In various examples, the vehicle computing device 1104 may also control actuation of various mechanisms herein that enable and disable the relative rotation of second panel 220 and third panel 230 about pins 701, 702 and/or the relative rotation of first panel 210 and second panel 220 about pins 703, 704 (e.g., via actuating electrically actuatable clutch(es) or electro-magnet (s) that are part of the assembly 200 so as to release the panels from being rotationally fixed with respect to each other). In examples, this control may be based upon a predetermined condition or a sensed condition, or may be based upon passenger input provided to the vehicle 1102.

The vehicle computing device 1104, based upon data received from the sensor system(s), may determine the height or distance of the vehicle 1102 from the ground or surface on which the vehicle 1102 is travelling, or is parked. Based upon the determined height or distance, the computing device 1104 may communicate, e.g., via the one or more communication connection(s) 1110 (described herein), with the drive module(s) 1114 (described herein) to activate the suspension system of the drive module(s) 1114 (e.g., activate hydraulic and/or pneumatic component(s)) to try to move the body of the vehicle 1102 up or down so that the height or distance of the body of the vehicle from the ground is at, or within, a prescribed height. By moving the vehicle body via the activation of the suspension system to a prescribed height, the amount that the step rotating actuator(s) need to be rotated can be preset so that, for the step deployment position, the step member 232 stops rotating when it is substantially horizontal, so that any load placed on the step member 232 (e.g., a passenger stepping onto the step member 233) prevents the pins located within slots of respective side bars to move downwardly within the slots.

Additionally, the drive module(s) 1114 may include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 1114. Furthermore, the drive module(s) 1114 may also include one or more communication connection(s) that enable communication by the respective drive module with one or more other local or remote computing device(s).

In at least examples, the direct connection 1112 may provide a physical interface to couple the one or more drive module(s) 1114 with the body of the vehicle 1102. For example, the direct connection 1112 may allow the transfer of energy, fluids, air, data, etc. between the drive module(s) 1114 and the vehicle.

In at least examples, the localization component 1120, the perception component 1122, the planning component 1124, and the one or more system controllers 1126, and various components thereof, may process sensor data, as described above, and may send their respective outputs, over the one or more network(s) 1144, to the computing device(s) 1136.

In some examples, the vehicle 1102 may send sensor data to the computing device(s) 1136 via the network(s) 1144. In some examples, the vehicle 1102 may receive sensor data from the computing device(s) 1136 and/or from remote sensor systems 1146 via the network(s) 1144. The sensor data may include raw sensor data and/or processed sensor data and/or representations of sensor data. In some examples, the sensor data (raw or processed) may be sent and/or received as one or more log files.

The computing device(s) 1136 may include processor(s) 1148 and a memory 1134 configured to store data. The processor(s) 1116 of the vehicle 1102 and the processor(s) 1148 of the computing device(s) 1136 may be any suitable processor capable of executing instructions to process data and perform operations as described herein.

Memory 1118 and 1134 are examples of non-transitory computer-readable media. The memory 1118 and 1134 may store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information.

It should be noted that while FIG. 11 is illustrated as a distributed system, in alternative examples, components of the vehicle 1102 may be associated with the computing device(s) 1136 and/or components of the computing device (s) 1136 may be associated with the vehicle 1102. That is, the vehicle 1102 may perform one or more of the functions associated with the computing device(s) 1136, and vice versa.

EXAMPLE CLAUSES

A: A vehicle comprising: a body comprising a floor area having a floor, and a passenger assist entry-exit assembly coupled to the body, the passenger assist entry-exit assembly comprising: a first panel, a second panel rotatably attached to the first panel, a third panel rotatably attached to the second panel and comprising a step member, a deployment actuator mechanism coupled to the first panel, the second panel and the third panel to move the first panel, the second panel, and the third panel from a retracted position in which the first panel, the second panel, and the third panel are at least substantially located under the floor to: (i) a step forming deployed position in which (a) at least the second panel and the third panel are located outside from under the floor, (b) the third panel is angled relative to the second panel, (c) the second panel is angled relative to the first panel, and (d) the step member is rotated to form a step substantially parallel to a ground, and (ii) a ramp forming deployed position in which (a) the step member is rotated to no longer be substantially parallel to the ground, (b) the third panel, the second panel and the first panel are located outside from under the floor, and (c) the first panel, the second panel and the third panel, including the step member, are substantially linearly aligned to form a ramp.

B: A vehicle as paragraph A describes, wherein the third panel comprises a wheel, the deployment actuator mechanism configured to move the first panel, the second panel and the third panel from the step forming deployed position to the ramp forming deployed position by causing the first panel, the second panel, and the third panel to roll along the ground on the wheel.

C: A vehicle as paragraph A describes, wherein the passenger assist entry-exit assembly comprises a first lateral side, and a second lateral side, and wherein the deployment actuator mechanism is attached to the body and comprises a first belt disposed on the first lateral side of the passenger assist entry-exit assembly, the first belt engaged with the first panel, the second panel and the third panel, a second belt disposed on the second lateral side of the passenger assist entry-exit assembly, the second belt engaged with the first panel, the second panel and the third panel, a first deployment motor, and a second deployment motor, the first deployment motor and the second deployment motor coupled to the first belt and the second belt, respectively, and configured to cause the first belt and the second belt to move the first panel, the second panel and the third panel from the retracted position to the step forming deployed position and to the ramp forming deployed position.

D: A vehicle as paragraph C describes, wherein the third panel comprises a first pivot coupling, a first bar extending on the first lateral side of the passenger assist entry-exit assembly, the first bar comprising a slot, a first linkage disposed on the first lateral side of the passenger assist entry-exit assembly, the first linkage comprising a first end portion fixed to the step member, and a second end portion coupled to the first bar and comprising a pin movable within the slot of the first bar, a second pivot coupling, a second bar extending on the second lateral side of the passenger assist entry-exit assembly, the second bar comprising a slot, and a second linkage disposed on the second lateral side of the passenger assist entry-exit assembly, the second linkage comprising a first end portion fixed to the step member, and a second end portion coupled to the second bar and comprising a pin movable within the slot of the second bar, and wherein the passenger assist entry-exit assembly comprises a step actuator mechanism comprising a first step rotating motor, a first bracket comprising a first portion rotatably fixed to the first step rotating motor, a second portion fixed to the step member and pivotable about the first pivot coupling of the third panel, a second step rotating motor, and a second bracket comprising a first end portion rotatably fixed to the second step rotating motor, and a second end portion fixed to the step member and pivotable about the second pivot coupling of the third panel, and wherein the first and second step rotating motors are configured to rotate the respective first and second brackets to cause the respective second portions of the first and second brackets to pivot about the respective first and second pivot couplings, thereby causing the step member to rotate while the respective pins of the first and second linkages move within the respective slots of the first and second bars so as to form the step for the step forming deployed position.

E: A vehicle as paragraph C describes, wherein the passenger assist entry-exit assembly comprises a first plurality of pulleys disposed on the first lateral side of the passenger assist entry-exit assembly, the first belt frictionally engaged with grooves of the first plurality of pulleys, a second plurality of pulleys disposed on the second lateral side of the passenger assist entry-exit assembly, the second belt frictionally engaged with grooves of the second plurality of pulleys.

F: A vehicle as paragraph A describes, wherein the body comprises guide rails, and wherein each of the first panel, the second panel, and the third panel are movable within and supported by the guide rails.

G: A vehicle comprising: a body; and a passenger assist entry-exit assembly coupled to the body, the passenger assist entry-exit assembly moveable from a retracted position in which the passenger assist entry-exit assembly is located inside the body and substantially aligned to (i) a step forming deployed position in which at least a portion of the passenger assist entry-exit assembly is located outside the body and forms a step, and (ii) a ramp forming deployed position in which said at least a portion of the passenger assist entry-exit assembly located outside the body forms at least a portion of a ramp.

H: A vehicle as paragraph G describes, wherein the passenger assist entry-exit assembly comprises a step member, and a step actuator mechanism configured to rotate the step member relative to a member of the passenger assist entry-exit assembly to form the step.

I: A vehicle as paragraph H describes, further comprising a deployment actuator mechanism, the deployment actuator mechanism configured to move the passenger assist entry-exit assembly between the ramp forming deployed position, the step forming deployed position and the retracted position.

J: A vehicle as paragraph I describes, wherein the deployment actuator mechanism comprises a first deployment motor and a second deployment motor, the first and second deployment motors configured to move the passenger assist entry-exit assembly between the ramp forming deployed position, the step forming deployed position and the retracted position.

K: A vehicle as paragraph H describes, wherein the passenger assist entry-exit assembly comprises a first lateral side, a second lateral side, a first panel, a second panel rotatably attached to the first panel, a third panel rotatably attached to the second panel, the third panel comprising the step member, a pivot coupling, a bar extending on the first lateral side of the passenger assist entry-exit assembly, the first bar comprising a slot, a linkage disposed on the first lateral side of the passenger assist entry-exit assembly, the linkage comprising a first end portion fixed to the step member, a second end portion coupled to the bar and comprising a pin movable within the slot of the bar, wherein the step actuator mechanism comprises a step rotating actuator, a bracket comprising a first portion rotatably fixed to the step rotating actuator, and a second portion fixed to the step member and pivotable about the pivot coupling of the third panel, and wherein the step rotating actuator is configured to rotate the bracket to cause the second portion of the bracket to pivot about the pivot coupling, thereby causing the step member to rotate while the pin of the linkage moves within the slot of the bar so as to form the step of the step forming deployed position.

L: A vehicle as paragraph I describes, wherein the deployment actuator mechanism comprises a belt, and a deployment actuator configured to rotate the belt to move the passenger assist entry-exit assembly from the retracted position to the step forming deployed position and to the ramp forming deployed position.

M: A vehicle as paragraph I describes, wherein the passenger assist entry-exit assembly comprises at least one wheel and the deployment actuator mechanism is configured to move the passenger assist entry-exit assembly from the step forming deployed position to the ramp forming deployed position by causing the passenger assist entry-exit assembly to roll along a ground on the at least one wheel.

N: A vehicle as paragraph H describes, wherein the passenger entry-exit assembly is attached to the body via a bracket, and wherein the body comprises a guide rail, the passenger assist entry-exit assembly moveable within, and supported by, the guide rail.

O: A vehicle as paragraph G describes, wherein the body comprises a floor area having a floor, and wherein the passenger assist entry-exit assembly is positioned substantially under the floor in the retracted position.

P: A vehicle as paragraph G describes, wherein the passenger assist entry-exit assembly comprises a first panel, a second panel rotatably attached to the first panel, and a third panel rotatably attached to the second panel and comprising a rotatable step member forming the step for the step forming deployed position.

Q: A vehicle as paragraph P describes, wherein the passenger assist entry-exit assembly comprises a deployment actuator mechanism coupled to the first panel, the second panel and the third panel and configured to move the first panel, the second panel, and the third panel from the retracted position in which the first panel, the second panel and the third panel are substantially aligned to: (i) the step forming deployed position in which (a) the third panel is angled relative to the second panel, (b) the second panel is angled relative to the first panel, and (ii) the ramp forming deployed position in which the first panel, the second panel, the third panel are substantially linearly aligned R: A vehicle as paragraph P describes, further comprising a vehicle computing device, and wherein the passenger assist entry-exit assembly comprises a mechanism that allows rotation of the second panel relative to the first panel and allows rotation of the third panel relative to the second panel, and wherein the vehicle computing device is configured to selectively actuate the mechanism to allow rotation of the second panel relative to the first panel and allow rotation of the third panel relative to the second panel.

S: A vehicle as paragraph P describes, wherein the passenger assist entry-exit assembly comprises a leaf structured and arranged so that (i) the leaf is located substantially above the first panel in the retracted position, (ii) and the first panel slides relative to the leaf so that the leaf is substantially aligned with the first panel, the second panel and the third panel in the ramp forming deployed position to form the ramp, wherein a length of the passenger assist entry-exit assembly is greater in the ramp forming deployed position than in the retracted position so that the passenger assist entry-exit assembly can be located under a floor of the body in the retracted position.

T: A vehicle passenger assist entry-exit assembly comprising: a plurality of panels attachable to a body of a vehicle, wherein one of the plurality of panels comprises a rotatable step member; and wherein the plurality of panels are movable between: (i) a step forming deployed position in which the rotatable step member is rotated to form a step, and (ii) a ramp forming deployed position in which the rotatable step member is rotated to form at least a portion of a ramp.

While the example clauses described above are described with respect to one particular implementation, it should be understood that, in the context of this document, the content of the example clauses may be implemented via a method, device, system, computer-readable medium, and/or another implementation. Additionally, any of examples A-T may be implemented alone or in combination with any other one or more of the examples A-T.

What is claimed is:

1. A vehicle comprising:

a body comprising a floor area having a floor, and a passenger assist entry-exit assembly coupled to the body, the passenger assist entry-exit assembly comprising:

a first panel, a second panel rotatably attached to the first panel, a third panel rotatably attached to the second panel and comprising a step member, a deployment actuator mechanism coupled to the first panel, the second panel and the third panel to move the first panel, the second panel, and the third panel from a retracted position in which the first panel, the second panel, and the third panel are at least substantially linearly aligned and located under the floor to:

(i) a step forming deployed position in which (a) at least the second panel and the third panel are located outside from under the floor, (b) the third panel is angled relative to the second panel, (c) the second panel is angled relative to the first panel, and (d) the step member is rotated to form a step substantially parallel to a ground, and (ii) a ramp forming deployed position in which (a) the step member is rotated to no longer be substantially parallel to the ground, (b) the third panel, the second panel and the first panel are located outside from under the floor, and (c) the first panel, the second panel and the third panel, including the step member, are substantially linearly aligned to form a ramp.

2. The vehicle of claim 1, wherein the third panel comprises a wheel, the deployment actuator mechanism configured to move the first panel, the second panel and the third panel from the step forming deployed position to the ramp forming deployed position by causing the first panel, the second panel, and the third panel to roll along the ground on the wheel.

3. The vehicle of claim 1, wherein the passenger assist entry-exit assembly comprises a first lateral side, and a second lateral side, and wherein the deployment actuator mechanism is attached to the body and comprises a first belt disposed on the first lateral side of the passenger assist entry-exit assembly, the first belt engaged with the first panel, the second panel and the third panel, a second belt disposed on the second lateral side of the passenger assist entry-exit assembly, the second belt engaged with the first panel, the second panel and the third panel, a first deployment motor, and a second deployment motor, the first deployment motor and the second deployment motor coupled to the first belt and the second belt, respectively, and configured to cause the first belt and the second belt to move the first panel, the second panel and the third panel from the retracted position to the step forming deployed position and to the ramp forming deployed position.

4. The vehicle of claim 3, wherein the third panel comprises a first pivot coupling, a first bar extending on the first lateral side of the passenger assist entry-exit assembly, the first bar comprising a slot, a first linkage disposed on the first lateral side of the passenger assist entry-exit assembly, the first linkage comprising a first end portion fixed to the step member, and a second end portion coupled to the first bar and comprising a pin movable within the slot of the first bar, a second pivot coupling, a second bar extending on the second lateral side of the passenger assist entry-exit assembly, the second bar comprising a slot, and a second linkage disposed on the second lateral side of the passenger assist entry-exit assembly, the second linkage comprising a first end portion fixed to the step member, and a second end portion coupled to the second bar and comprising a pin movable within the slot of the second bar, and wherein the passenger assist entry-exit assembly comprises a step actuator mechanism comprising a first step rotating motor, a first bracket comprising a first portion rotatably fixed to the first step rotating motor, a second portion fixed to the step member and pivotable about the first pivot coupling of the third panel, a second step rotating motor, and a second bracket comprising a first end portion rotatably fixed to the second step rotating motor, and a second end portion fixed to the step member and pivotable about the second pivot coupling of the third panel, and wherein the first and second step rotating motors are configured to rotate the respective first and second brackets to cause the respective second portions of the first and second brackets to pivot about the respective first and second pivot couplings, thereby causing the step member to rotate while the respective pins of the first and second linkages move within the respective slots of the first and second bars so as to form the step for the step forming deployed position.

5. The vehicle of claim 3, wherein the passenger assist entry-exit assembly comprises a first plurality of pulleys disposed on the first lateral side of the passenger assist entry-exit assembly, the first belt frictionally engaged with grooves of the first plurality of pulleys, a second plurality of pulleys disposed on the second lateral side of the passenger assist entry-exit assembly, the second belt frictionally engaged with grooves of the second plurality of pulleys.

6. The vehicle of claim 1, wherein the body comprises guide rails, and wherein each of the first panel, the second panel, and the third panel are movable within and supported by the guide rails.

7. A vehicle comprising:

a body; and a passenger assist entry-exit assembly comprising a plurality of panels and coupled to the body, the passenger assist entry-exit assembly moveable from a retracted position in which the passenger assist entry-exit assembly is located inside the body and the plurality of panels are substantially linearly aligned to (i) a step forming deployed position in which at least a portion of the passenger assist entry-exit assembly is located outside the body and forms a step, and (ii) a ramp forming deployed position in which said at least a portion of the passenger assist entry-exit assembly located outside the body forms at least a portion of a ramp.

8. The vehicle of claim 7, wherein the passenger assist entry-exit assembly comprises a step member, and a step actuator mechanism configured to rotate the step member relative to a member of the passenger assist entry-exit assembly to form the step.

9. The vehicle of claim 8, further comprising a deployment actuator mechanism, the deployment actuator mechanism configured to move the passenger assist entry-exit assembly between the ramp forming deployed position, the step forming deployed position and the retracted position.

10. The vehicle of claim 9, wherein the deployment actuator mechanism comprises a first deployment motor and a second deployment motor, the first and second deployment motors configured to move the passenger assist entry-exit assembly between the ramp forming deployed position, the step forming deployed position and the retracted position.

11. The vehicle of claim 8, wherein the passenger assist entry-exit assembly comprises a first lateral side, a second lateral side, a first panel, a second panel rotatably attached to the first panel, a third panel rotatably attached to the second panel, the third panel comprising the step member, a pivot coupling, a bar extending on the first lateral side of the passenger assist entry-exit assembly, the first bar comprising a slot, a linkage disposed on the first lateral side of the passenger assist entry-exit assembly, the linkage comprising a first end portion fixed to the step member, a second end portion coupled to the bar and comprising a pin movable within the slot of the bar, wherein the step actuator mechanism comprises a step rotating actuator, a bracket comprising a first portion rotatably fixed to the step rotating actuator, and a second portion fixed to the step member and pivotable about the pivot coupling of the third panel, and wherein the step rotating actuator is configured to rotate the bracket to cause the second portion of the bracket to pivot about the pivot coupling, thereby causing the step member to rotate while the pin of the linkage moves within the slot of the bar so as to form the step of the step forming deployed position.

12. The vehicle of claim 9, wherein the deployment actuator mechanism comprises a belt, and a deployment actuator configured to rotate the belt to move the passenger assist entry-exit assembly from the retracted position to the step forming deployed position and to the ramp forming deployed position.

13. The vehicle of claim 9, wherein the passenger assist entry-exit assembly comprises at least one wheel and the deployment actuator mechanism is configured to move the passenger assist entry-exit assembly from the step forming deployed position to the ramp forming deployed position by causing the passenger assist entry-exit assembly to roll along a ground on the at least one wheel.

14. The vehicle of claim 8, further comprising a bracket, and wherein the passenger entry-exit assembly is attached to the body via a bracket, and wherein the body comprises a guide rail, the passenger assist entry-exit assembly moveable within, and supported by, the guide rail.

15. The vehicle of claim 7, wherein the body comprises a floor area having a floor, and wherein the passenger assist entry-exit assembly is positioned substantially under the floor in the retracted position.

16. The vehicle of claim 7, wherein the passenger assist entry-exit assembly comprises a first panel, a second panel rotatably attached to the first panel, and a third panel rotatably attached to the second panel and comprising a rotatable step member forming the step for the step forming deployed position.

17. The vehicle of claim 16, wherein the passenger assist entry-exit assembly comprises a deployment actuator mechanism coupled to the first panel, the second panel and the third panel and configured to move the first panel, the second panel, and the third panel from the retracted position in which the first panel, the second panel and the third panel are substantially aligned to: (i) the step forming deployed position in which (a) the third panel is angled relative to the second panel, (b) the second panel is angled relative to the first panel, and (ii) the ramp forming deployed position in which the first panel, the second panel, the third panel are substantially linearly aligned.

18. The vehicle of claim 16, further comprising a vehicle computing device, and wherein the passenger assist entry-exit assembly comprises a mechanism that allows rotation of the second panel relative to the first panel and allows rotation of the third panel relative to the second panel, wherein the vehicle computing device is configured to selectively actuate the mechanism to allow rotation of the second panel relative to the first panel and allow rotation of the third panel relative to the second panel.

19. The vehicle of claim 16, wherein the passenger assist entry-exit assembly comprises a leaf structured and arranged so that (i) the leaf is located substantially above the first panel in the retracted position, (ii) and the first panel slides relative to the leaf so that the leaf is substantially aligned with the first panel, the second panel and the third panel in the ramp forming deployed position to form the ramp, wherein a length of the passenger assist entry-exit assembly is greater in the ramp forming deployed position than in the retracted position so that the passenger assist entry-exit assembly can be located under a floor of the body in the retracted position.

* * * * *